United States Patent
Strohm et al.

(10) Patent No.: US 7,653,617 B2
(45) Date of Patent: Jan. 26, 2010

(54) MOBILE SITEMAPS

(75) Inventors: Alan C. Strohm, Kirkland, WA (US); Feng Hu, Kirkland, WA (US); Sascha B. Brawer, Berne (CH); Maximilian Ibel, Pfaeffikon (CH); Ralph M. Keller, Zumikon (CH); Narayanan Shivakumar, Kirkland, WA (US); Elad Gil, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 11/415,947

(22) Filed: May 1, 2006

(65) Prior Publication Data

US 2007/0050338 A1    Mar. 1, 2007

Related U.S. Application Data

(63) Continuation of application No. 11/214,708, filed on Aug. 29, 2005, now abandoned.

(51) Int. Cl.
*G06F 17/30* (2006.01)
(52) U.S. Cl. .......................................................... 707/3
(58) Field of Classification Search ...................... 707/2, 707/3, 10, 200; 725/87; 709/237
See application file for complete search history.

(56) References Cited

U.S. PATENT DOCUMENTS

| | | | |
|---|---|---|---|
| 5,935,210 A | 8/1999 | Stark | |
| 5,958,008 A | 9/1999 | Pogrebisky et al. | |
| 6,038,610 A | 3/2000 | Belifiore et al. | |
| 6,269,370 B1 | 7/2001 | Kirsch | |
| 6,271,840 B1 | 8/2001 | Finseth et al. | |
| 6,285,999 B1 | 9/2001 | Page | |
| 6,321,265 B1 | 11/2001 | Najork et al. | |
| 6,360,215 B1 * | 3/2002 | Judd et al. | 707/3 |
| 6,418,433 B1 | 7/2002 | Chakrabarti et al. | |
| 6,424,966 B1 | 7/2002 | Meyerzon et al. | |
| 6,516,337 B1 | 2/2003 | Tripp et al. | |
| 6,525,748 B1 | 2/2003 | Belfiore et al. | |
| 6,631,372 B1 | 10/2003 | Graham | |
| 6,754,873 B1 | 6/2004 | Law et al. | |
| 6,820,075 B2 | 11/2004 | Shanahan et al. | |
| 6,957,383 B1 | 10/2005 | Smith | |
| 6,957,390 B2 | 10/2005 | Tamir et al. | |
| 6,976,053 B1 | 12/2005 | Tripp et al. | |
| 7,103,906 B1 * | 9/2006 | Katz et al. | 725/87 |
| 7,133,870 B1 | 11/2006 | Tripp et al. | |
| 7,231,395 B2 | 6/2007 | Fain et al. | |
| 7,243,102 B1 | 7/2007 | Naam et al. | |

(Continued)

FOREIGN PATENT DOCUMENTS

WO    WO 2001/27805    4/2001

(Continued)

OTHER PUBLICATIONS

'Ping Configurations' [online]. Technorati, Inc., 2004, [retrieved on Nov. 6, 2006]. Retrieved from the Internet: <URL: www.technorati.com/developers/ping/>, 3 pages.

(Continued)

*Primary Examiner*—Etienne P LeRoux
(74) *Attorney, Agent, or Firm*—Fish & Richardson P.C.

(57) ABSTRACT

A method of analyzing documents or relationships between documents includes receiving a notification of an available metadata document containing information about one or more network-accessible documents, obtaining a document format indicator associated with the metadata document, selecting a document crawler using the document format indicator, and crawling at least some of the network-accessible documents using the selected document crawler.

16 Claims, 14 Drawing Sheets

U.S. PATENT DOCUMENTS

| | | | |
|---|---|---|---|
| 2002/0052928 | A1 | 5/2002 | Stern et al. |
| 2002/0061029 | A1 | 5/2002 | Dillon |
| 2003/0158960 | A1* | 8/2003 | Engberg ............. 709/237 |
| 2004/0030683 | A1* | 2/2004 | Evans et al. ............ 707/3 |
| 2004/0078812 | A1 | 4/2004 | Calvert |
| 2004/0093327 | A1 | 5/2004 | Anderson et al. |
| 2004/0260680 | A1 | 12/2004 | Best et al. |
| 2005/0234895 | A1* | 10/2005 | Kramer ............... 707/3 |
| 2006/0004691 | A1 | 1/2006 | Sifry |
| 2006/0095424 | A1 | 5/2006 | Petropoulos |
| 2006/0122992 | A1 | 6/2006 | Bellaiche et al. |
| 2006/0212451 | A1* | 9/2006 | Serdy et al. ............ 707/10 |

FOREIGN PATENT DOCUMENTS

| | | |
|---|---|---|
| WO | WO 2001/46870 | 6/2001 |

OTHER PUBLICATIONS

'Soap meets RSS' [online]. Berkman Center, 2003, [retrieved on Nov. 6, 2006]. Retrieved from the Internet: <URL: www.//blogs.law.harvard.edu/tech/soapMeetsRss>, 2 pages.

'The Open Archives Initiative Protocol for Metadata Harvesting' [online]. Open Archives Initiative, 2002, [retrieved on Nov. 6, 2006]. Retrieved from the Internet: <URL: www.openarchives.org/OAI/openarchivesprotocol.html>, 38 pages.

U.S. Appl. No. 11/172,692, filed Jun. 30, 2005, "Sitemap Generating Client for Web Crawler,".

U.S. Appl. No. 11/172,764, filed Jun. 30, 2005, "Web Crawler Scheduler that Utilizes Sitemaps from Websites,".

International Preliminary Report on Patentability, PCT/US20006/032700, mailed Apr. 2, 2009, 5 pages.

International Search Report and Written Opinion, PCT/US20006/032700, mailed Mar. 19, 2008, 7 pages.

International Search Report, PCT/US2006/023792, mailed Oct. 20, 2006, 3 pages.

Ian Rogers, "The Google Pagerank Algorithm and How it Works," IPR Computing Ltd., May 16, 2002, 17 pages.

Examiner Stephane Michalski, Supplemental European Search Report & Written Opinion for Application No. 06789907.0/2201/1934825, dated Oct. 20, 2009, 12 pages.

Google Inc., "Sitemap Protocol" Available on the Internet: [retrieved on May 10, 2009] <URL: http://web.archive.org/web/20050605005091/www.google.com/webmasters/sitemaps/docs/en/protocol.html>.

Sullivan, D., "New Google Sitemaps" Web Page Feed Program: [retrieved on Oct. 6, 2009] <URL: :http://blog.searchenginwatch.com/050602-195224> Jun. 2005, pp. 1-2,.

* cited by examiner webmaster@gmail.com | Help | Sign out

Google Sitemaps

Google Sitemaps › Add Sitemap › Add Mobile Sitemap

Add a Mobile Sitemap

Mobile Sitemaps help Google find your mobile-ready content. This includes content for mobile phones, PDAs, and more.

Please follow the specific instructions for creating Mobile Sitemaps and submit your sitemap on this page.

Your Mobile Sitemap URL

[http://]
*Example: http://www.googlb.com/sitemap.xml*

Type of content

○ XHTML (WAP 2.0)
A new format for pages designed for phone screens.

○ WML (WAP 1.2)
Another format for pages designed for phone screens.

○ iMode
A format created by NTTDoCoMo using a derivation of HTML (cHTML).

○ PDA Devices
For pages designed for PDAs, including personal organizers, phones, music players, ebook readers, and more.

[Submit URL]

« Return to Google Sitemaps homepage

About Google Sitemaps · FAQ · Support page on Google Groups »

Figure 13

Google    Google Sitemaps (BETA)                                                    amandacamp@gmail.com | My Account | Help | Sign out

My Sitemaps
Total Sitemaps  8      Sitemap Protocol »
Errors          4      Sitemap FAQ »

Sitemaps | View: All  Errors |  Add a Sitemap +                                                                    Sitemaps 1 to 8 of 8

| Site | Sitemap | Type | Submitted | Last Downloaded | Status | Sitemap Actions |
|---|---|---|---|---|---|---|
| http://www-db.stanford.edu/ | index.html | Mobile | 2 minutes ago | â€" | Pending | Resubmit \| Remove |
| http://www-db.stanford.edu/~shiva/ - info | sitemap.xml | Web | Jul 13 | 2 hours ago | OK | Resubmit \| Remove |
| http://www.google.com/help/ | index.html | Mobile | 21 hours ago | 6 days ago | Parsing error | Resubmit \| Remove |
| http://www.google.com/ - verify | ig | Web | 3 minutes ago | â€" | Pending | Resubmit \| Remove |
| http://www.google.com/intl/sp/ - info | about.html | Web | Jul 21 | 6 days ago | Parsing error | Resubmit \| Remove |
| http://www.google.com/press/ | index.html | Mobile | Jul 21 | 6 days ago | Parsing error | Resubmit \| Remove |
| http://www.google.com/webmasters/sitemaps/ | login | Mobile | 0 minutes ago | â€" | Pending | Resubmit \| Remove |
| http://www.matik.org/test4/ - verify | sitemap.index | Web | Jun 22 | 2 days ago | Parsing error | Resubmit \| Remove |

Â© 2005 Google - Terms of Service - Privacy Policy - Discuss Sitemaps

Figure 14

MOBILE SITEMAPS

CROSS-REFERENCE TO RELATED APPLICATIONS

This application is a continuation application of and claims priority to U.S. application Ser. No. 11/214,708, filed on Aug. 29, 2005, now abandoned which is incorporated herein by reference.

TECHNICAL FIELD

This invention relates to locating information on a network such as the internet, and more particularly to indexing documents such as mobile-formatted websites so that applications such as a search engine serving mobile devices may more readily deliver results related to the documents in a form that can be displayed by the devices.

BACKGROUND

As the information available on the internet and other networks grows, it becomes more difficult for users to locate particular information that is relevant to them. For example, a user looking for information on "biking" could be given information about the physiological aspects of bicycling, bicycling routes in particular areas, economic information about relative sales of particular sporting goods companies, or the sales pages of various bicycle companies. The information provided to a user may also range from highly professional, well-researched information, to information that has few indications that its is accurate, or even helpful in any way. Users also want access to as much information as possible, from which the best wheat can be sorted from the worst chaff.

Search engines help users find relevant data. To do so, search engines generally catalogue or index all of the available data so that the index can be searched quickly when a user makes a search request. Search engines generally discover information by using "web crawlers" that, for example, follow links (also called hyperlinks) which connect one document, such as a web page or image file, to another. More particularly, a crawler may operate much like a very curious person who is "surfing" the web, by visiting each web page and then "clicking" on every link on the page until all links on the page and all links on any lower pages have been visited and indexed. This process is sometimes referred to as "discovery-based" crawling.

Traditional discovery-based crawling may have certain shortcomings in some situations. For example, crawl coverage may be incomplete, as there may be documents that the crawler is unable to discover merely by following links. Also, the crawler might fail to recognize some links that are embedded in menus, JavaScript scripts, and other web-based application logic, such as forms that trigger database queries. The crawler may also not know if a document has changed since a prior crawl, and the document thus may be skipped during a current crawling cycle. Moreover, the crawler might not know when to crawl a particular website and how much load to put on the website during the crawling process. Crawling a website during high traffic periods and/or excessive load during crawling can deplete network resources from the website, rendering the website less accessible to others.

Additional difficulties may arise when a crawler is looking for mobile content. In particular, most of the web sites available on the internet are intended for viewing with a full-featured desktop browser program (e.g., Netscape Navigator, Internet Explorer, or Firefox) that can display text, figures, animations, and other rich content. Many mobile devices, such as PDAs and cellular telephones, have a limited ability to display particular types of content. Thus, it may be preferable to classify certain indexed content by whether it is mobile content, and whether it will display properly on certain devices. When a crawler attempts to obtain mobile content, however, the crawler may attempt to simulate the activity of a real person using a browser in order to obtain content. To ensure that it can obtain all types of content, it may take on a large feature set that is not supported by some mobile devices, thus indexing inappropriate content for some users. Also, the crawler may pass a user-agent string to a server that indicates that the crawler is a sophisticated user having a full-featured browser. The server may then return content intended for such full-featured browsers and may hide equivalent but simpler mobile content intended for particular mobile devices or classes of mobile devices. Thus, there is a need for the ability to provide accurate analysis of mobile documents, such as through the use of a crawler system.

SUMMARY

In general, this document discusses systems and methods by which a content provider can produce a sitemap for one or more network-accessible documents, such as web pages, and may submit the sitemap to a remote computer, such as a computer associated with a search engine. The remote computer may then access the sitemap to more efficiently access and/or index the documents or information in the documents. The content provider, such as a webmaster who has built a web site or an automated content management system, may indicate that certain of the content is intended for display on particular mobile devices or other devices having limited display capabilities. The remote computer may use such an indication to select an appropriate mechanism for accessing and crawling the data. For example, a crawler may implement an instance directed to interpretation of XHTML-formatted content.

In one embodiment, a method of analyzing documents or relationships between documents comprises receiving a notification of an available metadata document containing information about one or more network-accessible documents, obtaining a document format indicator associated with the metadata document, selecting a document crawler using the document format indicator, and crawling at least some of the network-accessible documents using the selected document crawler. The network-accessible documents may comprise a plurality of web pages at a common domain, and the metadata document may comprise a list of document identifiers. In addition, the document format indicator may indicate one or more mobile content formats, including XHTML, WML, iMode, and HTML.

In some implementations, information retrieved from crawling at least some of the network-accessible documents may be added to an index. Also, a search request may be received from a mobile device and search results may be transmitted to the mobile device using information in the index. The available metadata document may also comprise an index referencing a plurality of lists of documents. In addition, an indication of document type (e.g, news, entertainment, commerce, sports, travel, games, and finance) for the one or more network-accessible documents may be received and the documents may be classified using the indication of document type. The identity of a provider of the indication of document type may also be verified to ensure that the provider is trusted.

In another implementation, a method of listing network-accessible documents is provided. The method comprises generating a mapping document that represents an organization of related network-accessible documents, and transmitting to a remote computer a notification that includes an indication that the mapping document is available for access and an indication of the format of the documents. The mapping document may comprise a list of document identifiers, and the indication of the format of the documents may indicate one or more mobile document formats that affect the ability to interpret the documents. The notification may also include an indication of the location of the mapping document, and may be transmitted when a user fills out a web-based form.

In yet another aspect, a system for crawling network-accessible documents is discussed. The system comprises a memory storing organizational information about network-accessible documents at one or more websites, and format information for the documents, a crawler configured to access the network-accessible documents using the organizational information, and a format selector associated with the crawler to cause the crawler to assume a persona compatible with formats indicated by the format information. The organizational information may comprise a list of URLs. Also, an agent repository may be provided that stores parameters for causing the crawler to assume a selected persona.

In another implementation, a system for crawling network-accessible documents is provided, and comprises a memory storing organizational information about network-accessible documents at one or more websites, and format information for the documents, a crawler configured to access the network-accessible documents using the organizational information, and means for selecting a crawler persona to present in accessing the network-accessible documents.

Another implementation involves a computer program product for use in conjunction with a computer system. The product comprises a computer readable storage medium and a computer program mechanism embedded therein. The mechanism comprises instructions for generating a mapping document that represents an organization of related network-accessible documents, and transmitting to a remote computer a notification that includes an indication that the list is available for access and an indication of the format of the documents. The mapping document may comprise a list of document identifiers, and the indication of the format of the documents may indicate one or more mobile document formats that affect the ability to interpret the documents. In addition, the notification may include an indication of the location of the mapping document, and the notification may be transmitted when a user fills out a web-based form.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 13 is an exemplary screen shot showing a display for adding a mobile sitemap to a search system.

FIG. 14 is an exemplary screen shot showing a display for viewing and managing sitemaps identified with a user.

Like reference symbols in the various drawings indicate like elements.

DETAILED DESCRIPTION

Figure 1:
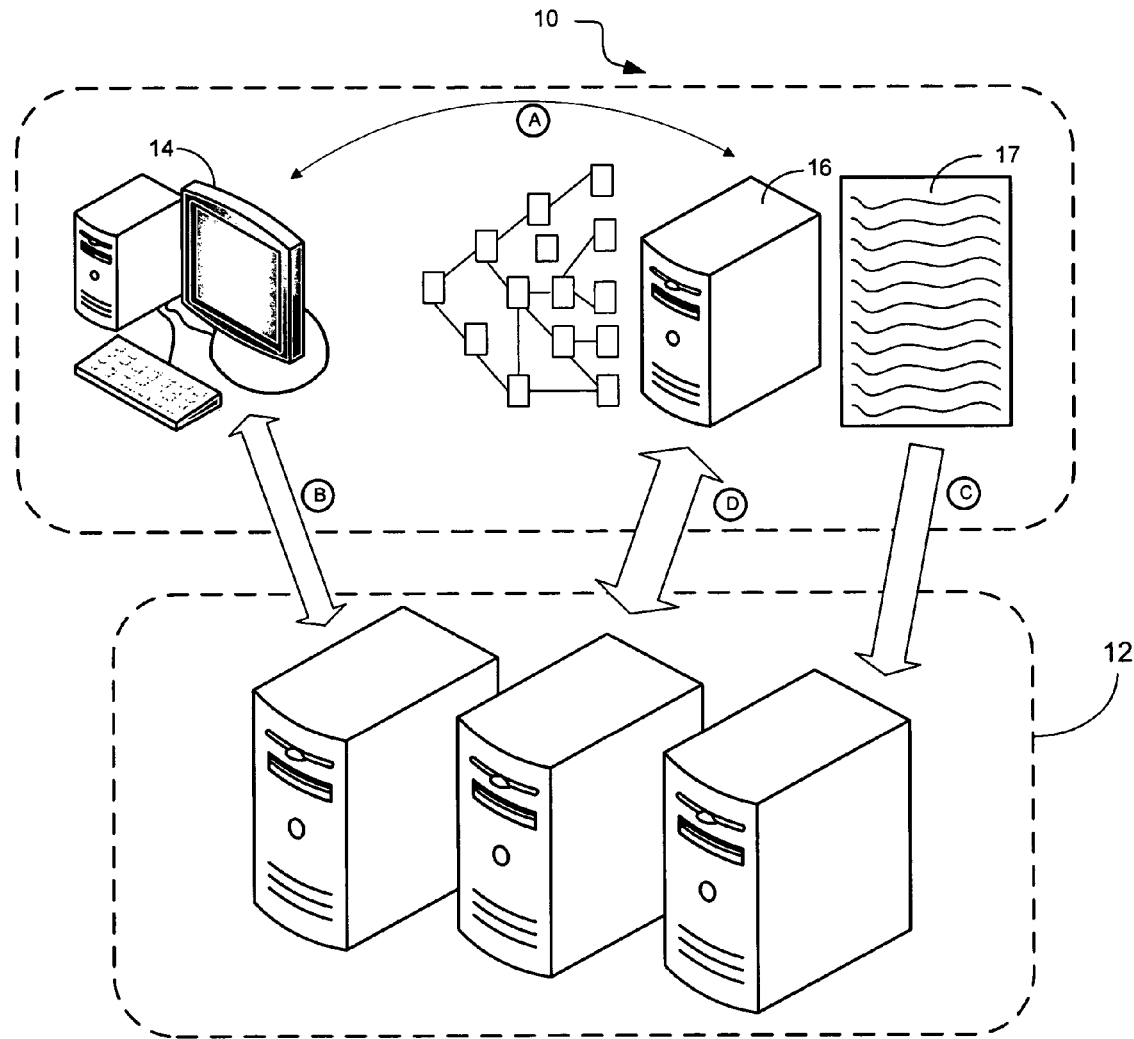
FIG. 1 is a conceptual diagram showing communications between components in a system for accessing and analyzing the organization of information in a part of the system.

FIG. 1 is a conceptual diagram showing communications between components in a system 10 for accessing and analyzing the organization of information in a part of the system 10. In general, the system 10 is configured so that a user, such as a webmaster, may develop content for a website, including content in a number of linked documents such as web pages. The user may then produce a "sitemap," which is a representation of the organization of the documents. For example, as described in more detail below, the sitemap may include an XML or other similar format of file having a list of URLs that indicate the organization of a web site, and may also include certain additional general data, or metadata, such as the format in which the content is stored, the speed with which the content should be accessed, and the frequency with which representations of the content should be updated.

The user, either directly or through an application program, may then notify another system, such as the components of a crawler for a search engine, that the sitemap is available, and may provide the location of the sitemap. The user may also provide an indication of the format of the documents to which the sitemap relates. For example, the user may indicate that the documents have an XHTML, WML, or iMode format if they are mobile documents. The crawler may then use this submitted information to select an appropriate crawling mode and to more efficiently retrieve information from the documents, such as for storing in an index of a search engine.

The identification of a document or group of documents' format may also occur automatically. For example, an automated process may identify features of one or more documents by implying a document format from the features. Such a process may also be carried out in a machine learning system, whereby determinations may be made automatically, the accuracy of the determinations tested, and rules for classifying documents according to format are updated according to improve the classification ability of the system. Predetermined rulesets may also be applied to the content of a document or documents in order to classify it as having a particular format. Such classification techniques are disclosed in co-pending U.S. patent application Ser. No. 11/153,123, entitled "Electronic Content Classification," filed Jun. 15, 2005, assigned to Google, Inc., and hereby incorporated by reference in its entirety.

The sitemaps, if used by web crawlers, may lead to greater crawl coverage, since the sitemaps may include documents, such as documents that are accessible only by a database query, that are not accessible by following links. The sitemaps may also provide last modification dates. Web crawlers may use the last modification dates to determine if a document has changed, and may thereby avoid crawling documents whose contents have not changed. The use of sitemaps to avoid crawling unchanged documents can make web crawlers and network crawlers significantly more efficient. The sitemaps also include information from which web crawlers may determine which documents to crawl first, the format or persona to present in crawling the documents, and how much load to put on the web server during crawling. This, too, may help conserve network resources.

The main components in this exemplary system 10 are a client 14, a server 16 associated with the client 14, and a server system 12 not immediately associated with the client 14. The client 14 may be, for example, a personal computer or other computer configured to give access to programs running on the client 14 or on other computers such as server 16 or server system 12. The client could also be a PDA, workstation, kiosk computer, or other appropriate computing platform.

The server 16 may be, for example, a web server or a server in communication with a web server, on which web-related content is stored. Thus, for example, a user at client 14 may work to develop a number of documents, such as web pages, that make up a website. The user may insert hyperlinks between and among the various documents, and may also include links to other documents outside the website, whether stored on server 16 or elsewhere. The server 16 may also be part of client 14 itself. The particular physical configuration is not critical, and various implementations would be understood by those skilled in the art. Client 14 and server 16 are shown in a separate dotted box from server system 12 to indicate that, in general, client 14 and server 16 will be operated by a single organization (such as a corporation having a website), while server system 12 will generally be operated by a separate organization (such as a search engine provider).

Server system 12 may be part of a system remote from client 14 and server 16. Servers may be, for example, part of a search engine system such as that operated by Google. Though shown as a series of similar server computers, the servers in server system 12 could include, for example, blade servers or other computing platforms for receiving requests from clients and providing appropriate responses to the requests. As described in more detail below, the servers 16 may include web servers for receiving requests and transmitting responses, along with content servers for gathering appropriate information for responding to requests, and ad servers for selecting and producing appropriate promotional content. The use of the terms "client" and "server" are not intended to impose a particular requirement on either type of computer. Rather, a client may simply be a computer looking to access certain data, while a server may be a computer supplying the data. A single computer could thus be a client in one situation and a server in another.

Lettered arrows in FIG. 1 show an exemplary flow of information between the components of system 10. In a first communication session, indicated by arrow A, client 14 communicates with server 16 to produce content such as web-based documents. For example, client 14 may run an instance of a web authoring application (e.g., Adobe Sitemill, GoLive CyberStudio, HoTMetal Pro, Macromedia Dreamweaver, NetObjects Fusion, or Microsoft FrontPage) or a more complex content management system (e.g., from Vignette, Interwoven, or Stellant). The user may generate a number of web pages and may link them together in various manners. Also, certain pages may not be otherwise linked in a manner that they could be reached by typical discovery-based crawling (e.g., deep web content). Processes for developing web-accessible content are well known.

When the documents are at a certain point of completion, such as when the user intends to make the documents available publicly, the user may cause a sitemap 17 to be generated for the documents, as described in more detail below. The sitemap 17 may represent part or all of the organization of the documents, and could, for example, include a list or grouping of uniform resource locators (URLs) for the documents. The sitemap 17 may take an appropriate form, such as an Extensible Mark-Up Language (XML) document using predefined XML tags. The sitemap 17 may also contain other information, such as general information about the manner in which the documents should be crawled, as described in more detail below. Other formats may also be used, including plain text, comma-delineated values, and semicolon-delineated values. The sitemap 17 may thus be used by other applications as a guide, in the form of metadata, to the organization of the documents.

As shown by arrow B, the client 14 may then be caused (either automatically or manually) to contact server system 12 and may transmit information about the sitemap 17. For example, the client 14 may provide the location of the sitemap 17. In addition, the client 14 may provide information about the format of the documents associated with sitemap 17. For example, the client 14 may indicate that the documents are formatted according to a particular standard, such as a mobile content standard. The client 14 may also provide an indication of how often the documents should be crawled (i.e., documents that are updated often should be crawled often, while documents that are updated little should not be crawled often). Other such parameters may also be provided by the client 14. One or more such parameters may also be included in the sitemap 17 or other related document or documents, so that server system 12 may access them rather than having them provided at the client's instigation.

Arrow C indicates that the server system 12 may obtain sitemap 17 data once it has been informed that the sitemap 17 exists. For example, server system 12 may make an HTTP request to the location identified in the communication labeled by arrow B, and may thereby obtain the data in the sitemap 17. In addition, sitemap 17 may be a sitemap index that points to one or more other sitemaps, or a different document associated with a sitemap that allows server system 12 to obtain information about the organization of the documents at server 16.

The server system 12 may then, via arrow D, crawl or otherwise access the documents stored on server 16. The crawling process may, in appropriate circumstances, occur by stepping through each URL listed in the sitemap. Such identified documents may also be navigated via discovery-based crawling, so that the full set of accessed documents includes the superset of the documents listed in the sitemap and all documents referenced either directly or indirectly in those documents.

Where a document format indicator has been passed to server system 12, the server system 12 may select a particular persona of browser to conduct the crawling operations. For example, the crawler, in its request, may include a user-agent indicator for a particular device or class of devices. For example, the user-agent indicator may provide an indication that the crawler is capable only of interpreting WML-formatted content. By providing such an indicator, the crawler can help ensure that it will receive content in the appropriate format, and will not be directed to other, more complex content.

The use of a particular user-agent with the crawler may also cause the crawler to place information about the documents in a particular index related to the relevant format. For example, server system 12 may maintain separate indices for content designed to be displayed on mobile devices and content too complex for mobile devices. Separate indices may also be maintained for particular types (or groups of types) of mobile content, such as iMode, 3g, xhtml, pdahtml, or wml. Thus, when a user later submits a search request, the system may determine the type of device the user has, and may search only in the index associated with content that may be displayed on such a device. The content may also all be stored in a single index, with a parameter available to identify the format of each document or group of documents so that appropriately-formatted content may be located.

In sum, by the process just described, an author of a website may manually or automatically generate a document or documents that represent the organization of certain network-accessible (e.g., LAN, WAN, or internet) documents. The user or the user's application may notify a remote server or servers, such as servers associated with an internet search engine, of the location of the document(s) (e.g., by passing a URL for the document(s)), and perhaps additional parameters relating to the document(s). The remote servers may then use the sitemap or sitemaps to traverse the documents more efficiently, more accurately, or more completely than might otherwise be possible in the absence of a sitemap. In addition, the servers may select a particular persona of crawler that allows the crawler to obtain relevant content, such as mobile-formatted content, and may store this special content separate from other indexed content, or otherwise flag the content.

Figure 2:
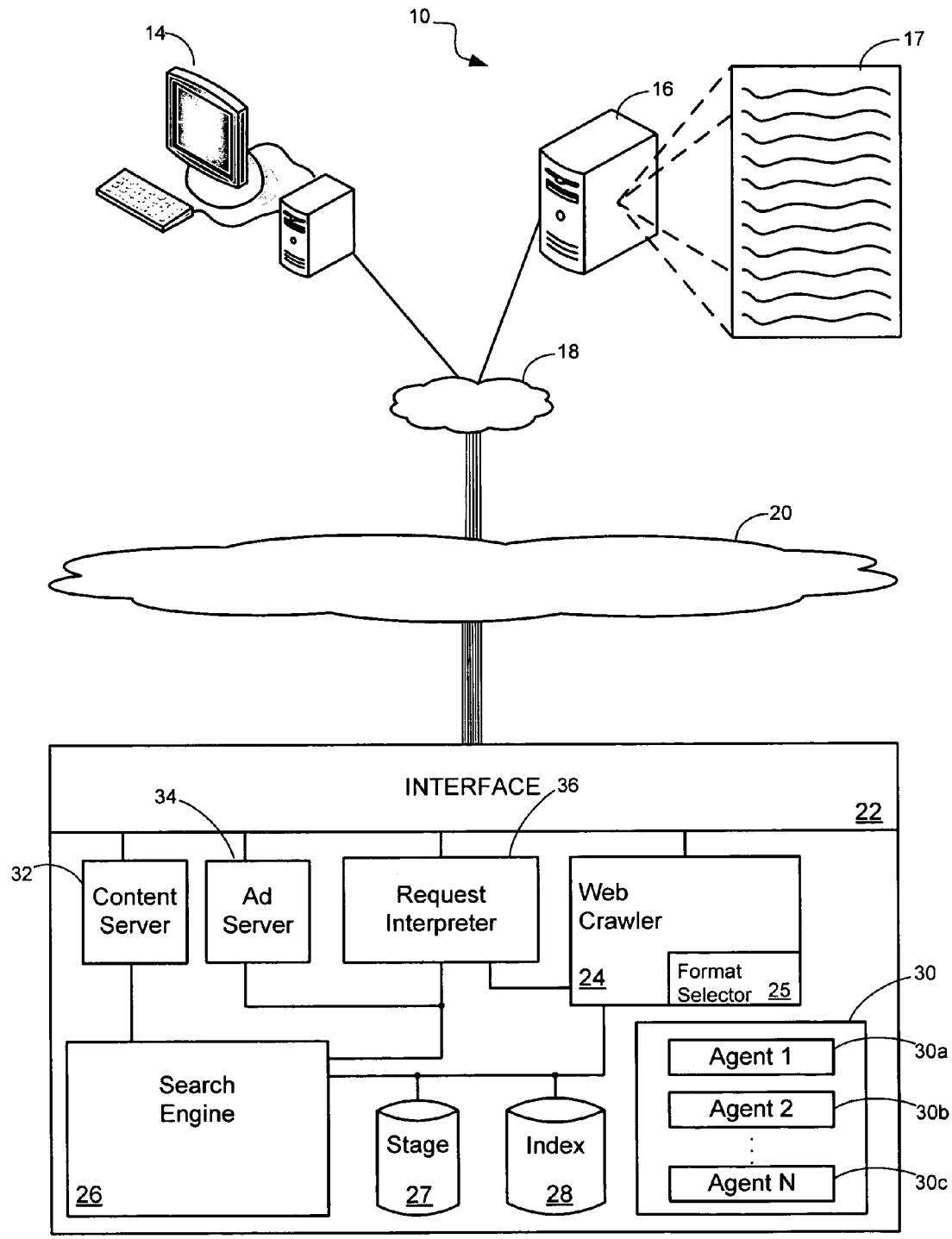
FIG. 2 is a schematic diagram of a system for indexing internet documents for access by a search engine.

FIG. 2 is a schematic diagram of a system 10 for indexing internet documents for access by a search engine. Again, the system includes a client 14, server 16, and server system 12. Additional detail is shown in this figure, particularly with respect to the structure of server system 12. The particular structures pictured and described here are exemplary only. Other appropriate and equivalent structures may also be employed, as the needs of a particular application require. Also, various components may be added, pictured components may be removed, or various components may be combined or split apart without altering the operation of the system 10.

In FIG. 2, client 14 is shown linked to server 16 through a network such as a LAN or WAN. Thus, for example, the client 14 and server 16 may comprise computers operated within a single organization or related organizations. For example, client 14 may be a personal computer assigned to a web administrator at an organization or a programmer. Server 16 may be a server operated by the organization, such as a web server or a computer in communication with a web server. As shown, client 14 may communicate with server 16 so that a sitemap 17 is generated and made available, such as to server system 12.

Server system 12 may communicate with client 14 and server 16, in addition to other systems, via network 20, which may include, for example the internet, cellular data systems, and the public switched telephone network (PSTN). Interface 22 may be provided to manage communications between server system 12 and other components. Interface 22 may include, for example, one or more web servers. The interface 22 may control some or all communications with the remainder of server system 12. For example, the interface 12 may reformat messages received from outside server system 12 into a form that can be used by other components in server system 12, and may also route messages to the appropriate component or components within server system 12. In addition, interface 22 may combine information from multiple components within server system 12 and format it into a form that can be transmitted outside server system 12, such as an HTTP message.

Interface 22 may provide messages to, for example, a request interpreter 36, which may be configured to analyze incoming messages. Such analysis may allow request interpreter 36 to determine which, of the various components in server system 12, should receive a particular message. Request interpreter 36 may, for example, look at header information to determine characteristics of the message such as the location from which it was sent or the type of device from which it was sent. Also, request interpreter 36 may look at the content of the message, such as at syntactical indications, to determine which components of the system 12 need to see the message or certain information in the message. Request interpreter 36 may also be part of interface 22.

Incoming messages requesting search results may be routed to search engine 26, which may provide relevant results in response to search requests, as is known in the art. For example, search engine 26 may compare the content of a search request to information stored in an index 28. Index 28 may contain data that represents information in documents on a network, such as the internet, so that search engine 26 may provide a user with connections, such as through URLs, to information helpful to the user. The search engine 26 may identify and rank matches to a search result using methods such as the well-known PageRank process.

Such results may be routed through content server 32, which may gather and format results. For example, content server 32 may receive results from multiple search engine 26 instances, so that a large number of near simultaneous search requests can be handled across a large system, with a portion of each request handled by a particular search engine 26 component. Content server 32 may merge all of the individually-generated results into a result list, such as a list of URLs, along with snippets and address information for each match.

Other content responsive to a request, such as promotional content, may be provided by an ad server 34. The ad server 34 may have access to a number of promotional items that are each associated with one or more keywords or other identifiers. The ad server 34 may look for correspondence between a request and the identifiers, and may then select promotional items that match the request. The selection and ranking of items may be based, for example, on an amount an advertiser has agreed to pay, the degree of match between the request and the identifiers for the item, and on an indication of relevance between the request and the item (such as how often other users submitting the same request have selected the item). Interface 22 may then combine results from ad server 34 and content server 32 to produce a result to a request, such as in the form of a generated web page.

Index 28 used by search engine 26 may be built and maintained using data gathered from the network by a crawler 24. In particular, crawler 24 may traverse documents on the network, such as by using links between and among documents, or by using supplied mapping information about documents, their locations, and/or their relationships with other documents. Crawler 24 may operate continuously or nearly continuously, and may be split into multiple crawling strings or separate servers running coordinated or wholly separate crawlers.

Crawler 24 may be configured to identify a particular format or style of document, or may be configured to analyze multiple formats or styles, and may be switched among the various available formats or styles. As such, crawler 24 may be able to impersonate a number of various agents or combinations of agents in the process of obtaining information from documents on the network 20. For example, crawler 24 may impersonate a mobile handset having WML or XHTML capabilities, or an iMode device. A crawler for mobile formats may operate as a separate instance or instances of a crawler than other crawling pipelines. However, the same general structure for crawling may be shared between full-featured desktop crawl instances, and limited-feature mobile crawls, with the exception of a parameter to limit the visibility of the mobile instances. In addition, as described below, mobile crawlers and non-mobile crawlers may share a common front-end by which users or applications interface with the system.

Crawler 24 may access parameters for each such agent from a ruleset 30. The ruleset 30 may, for example, contain parameters defining a first agent 30a, which may define, for example, an agent for obtaining normal HTML-formatted information. The ruleset 30 may also include a second agent 30b, which may define, for example, an agent for obtaining XHTML and WML-formatted information. Finally, ruleset 30 may include an n-th agent 30c, which may define, for example, an agent for obtaining iMode-formatted information. Other agents for other formats or groups of formats may also be defined and made available.

Crawler 24 may also include a format selector 25 that controls the persona taken by the crawler 24 when crawling certain documents. Format selector 25 may select a particular agent 30a-30n, for example, by looking to values in storage 27 corresponding to a particular sitemap. For example, where a client 14 has identified sitemap 17 as conforming to a particular format, that identification may be stored in storage 27. When crawler 24 then determines to crawl documents represented by sitemap 17 (such as after a user has first provided the location of sitemap 17 or at a predetermined update time for the sitemap 17), crawler 24 may access the location of the sitemap and the format identification from storage 27, and may select an agent 30a-30n that permits the crawler 24 to present a persona of a particular device or class of devices. The crawler 24 may then proceed to crawl the documents associated with the sitemap 17.

Server system 12 is pictured for clarity as including only a limited number of components. It should be appreciated, however, that a system could include many additional functions and components, as needed to provide a full range of services to users of system 10. For example, server system 12 may provide news, weather, portal, shopping, mapping, and other services. In addition, the components of server system 12 may be combined or separated as is appropriate.

Figure 3:
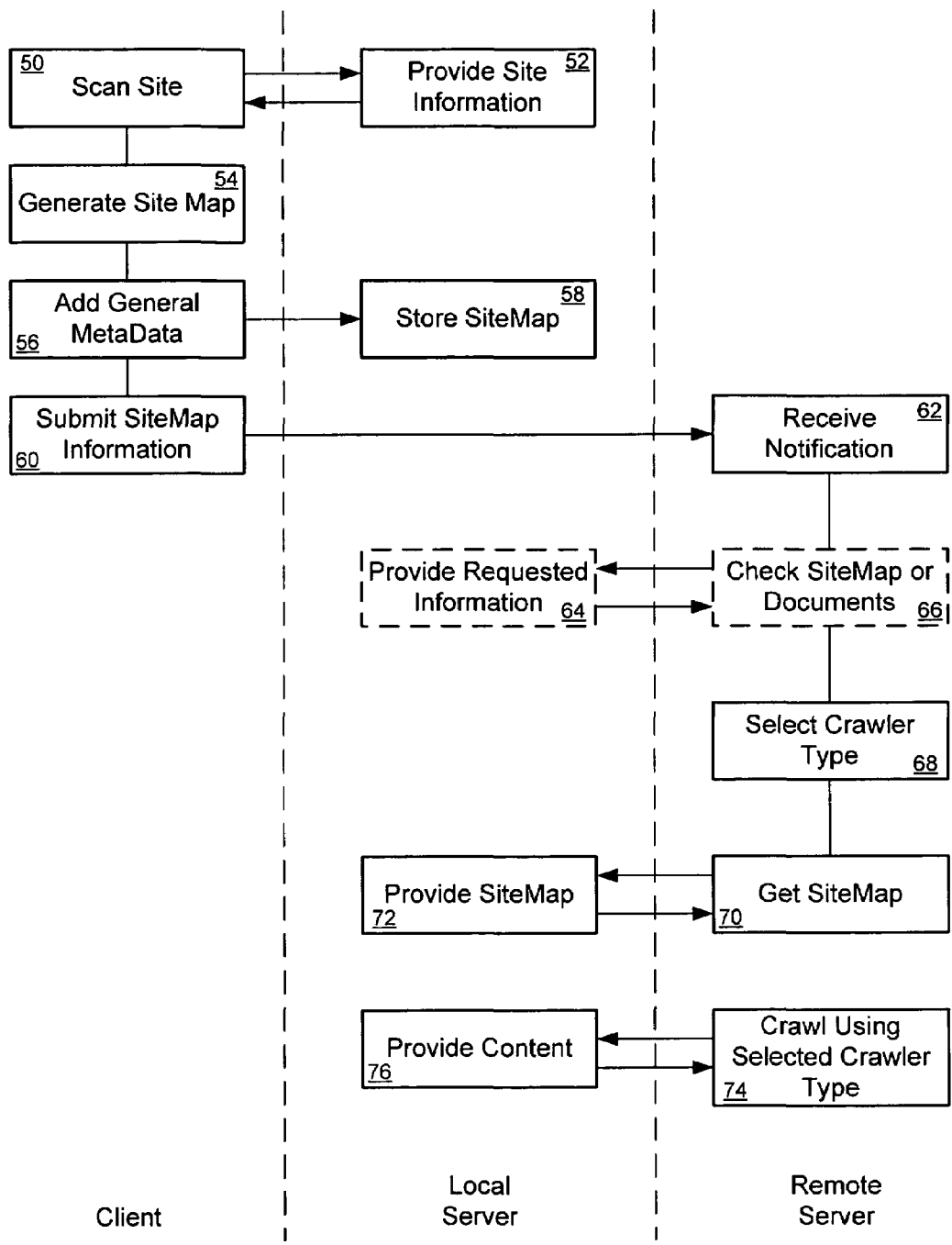
FIG. 3 is a flow diagram illustrating actions for accessing and analyzing the organization of information in a system.

FIG. 3 is a flow diagram illustrating actions for accessing and analyzing the organization of information in a system. For clarity, the actions are indicated as occurring at a client, a local server, and a remote server. However, the actions or similar actions could also be carried out by fewer computers, or computers arranged in a different configuration.

In the method, a website is first scanned (50) to determine the organization of documents relating to the site. A local server on which the website is stored may in turn provide information about the website (52). For example, a website author may identify the URLs of every page on a web site that the author would like to make available across a network, such as to the public over the internet. The author may then make a list of all of the URLs or other document identifiers for the site, whether those URLs represent documents that link to each other or documents having no links. Alternatively, the website may be analyzed or scanned automatically, such as by a document management system that has been used to generate the site.

The organization of documents may then be recorded by generating a sitemap (54). The sitemap may be, for example, an XML document having a predetermined format, and may include a list of URLs for the documents in the website. In addition, general metadata may be added to the sitemap (56). For example, as described in more detail below, data about the format of the documents referenced by the sitemap, the speed at which the documents should be accessed, and the frequency for updating information about the sitemap may all be specified in the general metadata. The sitemap may then be stored, such as on the local server, along with the website information (58). The generation of metadata for the sitemap may also occur manually or automatically.

Once the sitemap is generated and stored, it may be identified to a remote server (60), which after receiving such notification (62) about the sitemap, may access the sitemap. The notification may occur manually, such as by a user logging onto a website hosted by the remote server or a server associated with the remote server (e.g., when a clearinghouse gathers sitemap information at one central point and then shares it with various search engines, e.g., at predetermined update points so that all search engines receive the information simultaneously, or at staggered points so that the search engines do not overload the user's website with crawlers).

Various information may be submitted as part of the notification. For example, minimal information, such as the location of the sitemap, may be submitted, and the remote server may obtain additional information from the sitemap or from a related document. Alternatively, additional information may be provided, such as the format of the documents at the website, and other metadata that would otherwise (or in addition) be located in the sitemap. Alternatively, the notification may include submission of the entire sitemap.

Once the remote server has received the necessary notification information, it may check the sitemap or related documents for any additional information it may need to explore and analyze the sitemap or the user's website (66). The local server may respond accordingly to any such requests (64). For example, where the notification has involved minimal information, the remote server may need to obtain additional information to conduct its crawling of the website. Because such additional information retrieval is dependent on the user providing incomplete information when notifying the remote server, so that the steps would often be unnecessary, the boxes for these steps (64, 66) are shown dashed.

The remote server may also select a crawler type or crawler persona for crawling the website (68). For example, where the user has identified a website as being formatted according to a particular mobile-based format, the remote server may simulate the performance of a device for viewing such mobile content when crawling the website.

When the remote server has sufficient information to locate the sitemap, it may access the sitemap and begin using information in the sitemap to crawl the website (70, 72). The crawler may crawl the website using the selected crawler type (74), when a particular format or formats have been identified, and the local server may in turn provide the content (76) such as by serving up all of the documents referenced in the sitemap.

For example, the crawler may step through the sitemap list, when it is formatted as a list, and may make a request of the first item in the list. The crawler may analyze the content of that first item, indexing some of the content, and identifying any links in the first item. The crawler may then make requests of any linked-to items, and repeat the analysis and linking process until it has exhausted that branch of the website. The crawler may then move to the next entry in the sitemap list. The crawler may also store a list of all documents it has accessed so that it does not make repeated accesses to a document that is linked to from multiple locations.

Figure 4:
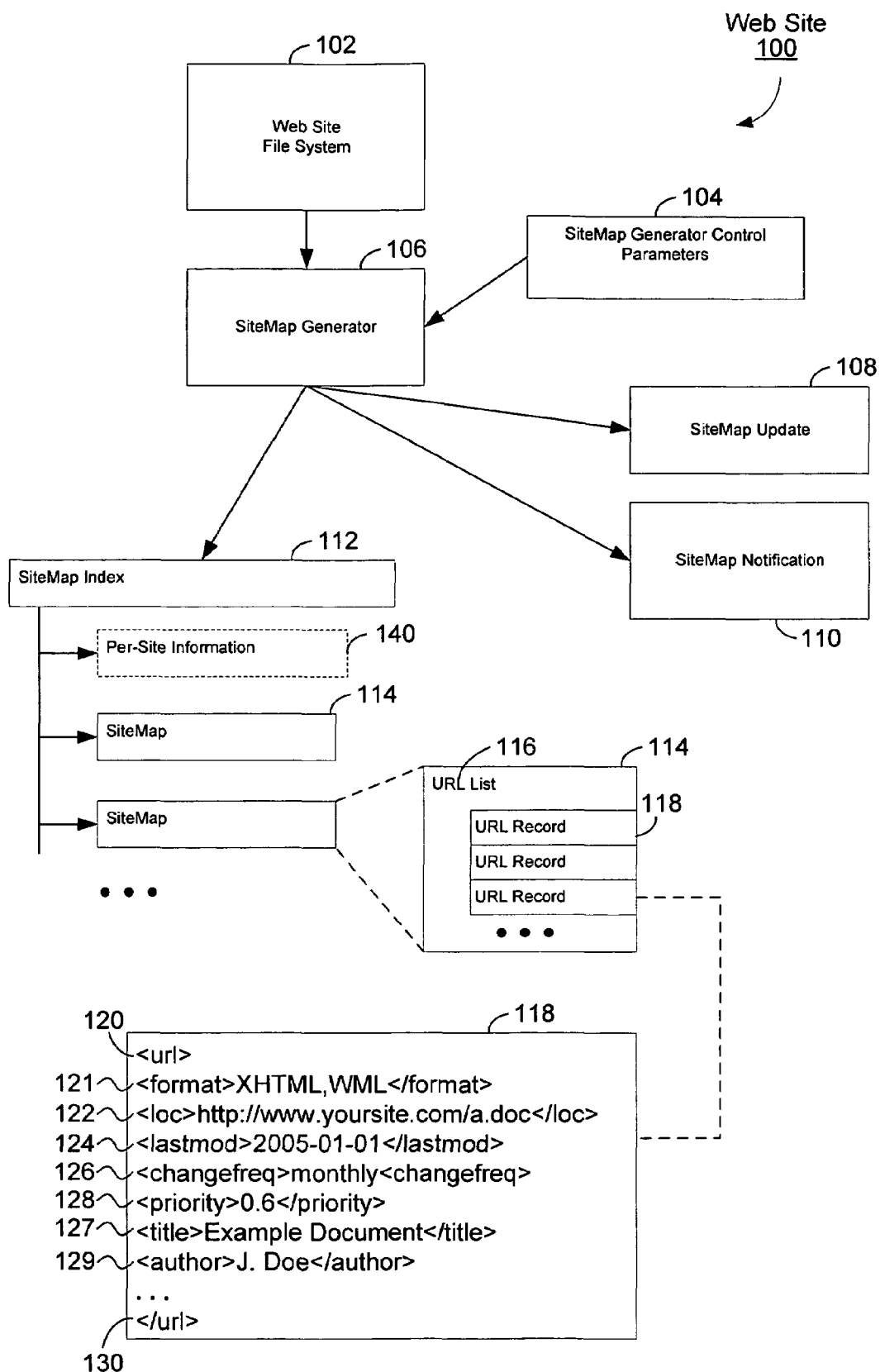
FIG. 4 is a conceptual diagram of a process for generating a sitemap for a website.

FIG. 4 is a conceptual diagram of a process for generating a sitemap for a website 100. The website 100 includes a website file system 102, sitemap generator control parameters 104, a sitemap generator 106, a sitemap update module 108, a sitemap notification module 110, sitemaps 114, and sitemap indices 112. The file system 102 may be implemented in some embodiments using any of a number of file systems, including distributed file systems in which files are stored on multiple computers. In other embodiments, the file system 102 may be implemented using a database or search engine that produces documents in response to queries.

The website file system 102 organizes the documents that are stored at the web server. A document stored at the website may be any appropriate machine-readable file that includes text, graphics, video, audio, etc., or any combination of those items. Examples of documents that may be stored at a website include, among others, web pages, images, video files, audio files, Portable Document Format (PDF) files, plain text files, executable files, presentation files, spreadsheets, word processor documents, and so forth.

The documents stored at the website 100 may be organized in a hierarchal structure. That is, the documents may be organized into a tree of nested directories, folders, or paths (hereinafter the "directory tree"). The directory tree includes a root directory/folder/path, and the root may have subdirectories/sub-folders/subpaths nested within.

The subdirectories/sub-folders/subpaths may also have further subdirectories/sub-folders/subpaths nested within, thus forming a directory tree. Each document may be stored in a directory/folder/path in the directory tree. Each directory/folder/path and each document may be a node in the tree. The file system may also store metadata associated with the documents, such as a last modification date, a last access date, document permissions, and the like. In some embodiments, the file system may also include a database of documents and associated metadata. Documents in the database may be accessed by executing a query of the database as well as, or instead of, traversing the directory tree.

Each document stored at the website may be identified and/or located by a locator. In some embodiments, the locator is the URL of the document. In some other documents, alternative manners of identification (e.g., URIs) or addressing may be used. The URL of a document may be derived from its location in the file system. The URL of a document may be based on the directory/folder/path, or the location in a database, or on the query used to retrieve the document from the database in which the document is stored. That is, each document in a directory/folder/path or a database location may be mapped to an URL. In some embodiments, the URLs may be used by computers external to the website, such as remote computers associated with web crawlers, to access the documents in the file system that are open to external access. For convenience of explanation, the document locators are described below as if they are URLs.

The sitemap generator 106 generates sitemaps and, optionally, one or more sitemap indexes of the website. The sitemaps may be used by web crawlers to schedule their crawls of documents stored at the web server. Sitemap indexes, further details of which are described below, encapsulate one or more sitemaps, and may contain, for example, a list of sitemaps.

The sitemap generator 106 generates sitemaps by accessing one or more sources of document information. In some embodiments, the sources of document information include the file system 102, access logs, pre-made URL lists, and content management systems. The sitemap generator 106 may gather document information by simply accessing the website file system 102 and collecting information about any document found in the file system 102. For instance, the document information may be obtained from a directory structure that identifies all of the files in the file system, or in a defined portion of the file system.

The sitemap generator 106 may also gather document information by accessing the access logs (not shown) of the website. The access logs record accesses of documents by external computers. An access log may include the URLs of the accessed documents, identifiers of the computers accessing the documents, and the dates and times of the accesses. The sitemap generator 106 may also gather document information by accessing pre-made URL lists (not shown). The pre-made URL lists list URLs of documents that the website operator wishes to be crawled by web crawlers. The URL lists may be made by the website operator using the same format as that used for sitemaps, as described below.

If the documents in the website are managed via a content management system, the sitemap generator 106 may gather document information by interfacing with the content management system and accessing the information stored within the content management system.

The sitemap generator control parameters 104 include predefined parameters that control the generation of sitemaps. Further information regarding the sitemap generator control parameters 104 is described below, in relation to FIG. 5.

The sitemap generator 106 generates sitemaps 114 and possibly one or more sitemap indices 112. The sitemap 114 and sitemap index 112 may be generated using any suitable format and language. As noted above, in some embodiments, the sitemap is generated in Extensible Markup Language (XML) format, using predefined XML tags. For convenience of description, sitemaps and sitemap indexes below are described as formatted using XML.

A sitemap index 112 is a document that is associated with one or more sitemaps 114 to assist in the organization of, and reference to the sitemaps. The sitemap generator 106, when generating sitemaps for the website, may generate multiple sitemaps, with each sitemap listing a subset of URLs of documents that may be crawled, rather than listing URLs of all documents that may be crawled in one sitemap. In such a situation, the sitemap generator 106 may also generate a sitemap index 112 to list the multiple sitemaps and their URLs. A sitemap index may include starting and ending tags (e.g., XML tags such as <sitemapindex> and </sitemapindex>, not shown in the Figures) defining the beginning and end of the sitemap index 112. The sitemap index 112 also may include URLs of each sitemap listed in the sitemap index.

The sitemap index may also include optional metadata for respective sitemap URLs in the sitemap index. For instance, the metadata may include a last modification date of the respective sitemap. Each sitemap URL and any respective associated metadata may be enclosed by starting and ending tags that define the beginning and end of a sitemap record 114 in the sitemap index 112.

In addition to the list of sitemaps, in some embodiments a sitemap index may optionally contain a list of site-specific information 140 (also called "per-site information") that applies to an entire website. For example, a sitemap index may contain a list of time intervals and a rate at which the crawler should crawl the respective website (e.g., <crawl_rate from=08:00UTC to=17:00UTC>medium</crawl_rate>
<crawl_rate from=17:00UTC to=8:00UTC>fast</crawl_rate>).

In other examples, a sitemap index contains geographic information identifying a geographic location associated with the website (e.g., <location>latitude, longitude</location>), and/or it may contain language information identifying one or more languages supported by or otherwise associated with the respective website (e.g., <language>German</language>). The per-site information may also include a document format type (or types) for the site, such as XHTML, 3g, PDAHTML, WML, or iMode/cHTML.

In some embodiments, per-site information may also be present in the sitemap references in a sitemap index file. If both the sitemap index and a referenced sitemap contain per-site information for the same property (e.g., crawl rate), then the value specified in the sitemap may override the value specified in the sitemap index because the sitemap is a more specific instance of the information. In other embodiments, per-site information may be specified in a sitemap index or sitemap using syntax other than the examples given here.

In one embodiment, the sitemap generator 106 of a website generates a new sitemap at regular intervals, such as daily or weekly. Each new sitemap generated, after a first (starting point) sitemap, may list only URLs that are new or modified since the prior sitemap was generated (i.e., have a creation date or modification date after the date that the last sitemap was generated). The term "date" is used here to allow for the inclusion of date and time, and may be represented by a timestamp, such as an ISO 8601 compatible timestamp using UTC (coordinated universal time). In these embodiments, the sitemap index for the website lists all the sitemaps generated for the website.

Optionally, a new starting point sitemap may be generated by the sitemap generator at larger intervals (e.g., weekly or monthly) than the intervals at which the update sitemaps are generated. Each time a new sitemap is generated and added to the sitemap index 112, a notification may be sent to one or more search engines or crawlers.

A sitemap 114 is a document or documents that list the URLs of documents in a website that may be crawled by a web crawler, or otherwise indicates the organization of documents in a website or other networked location. A sitemap 114 may include a list of URLs and, optionally, additional information, such as metadata, for respective listed URLs. A sitemap 114 may include starting and ending tags 116 that define the beginning and end of the sitemap. The sitemap may also include one or more URL records 118. The beginning and end of each URL record 118 may be defined by a starting tag 120 and an ending tag 130. Each URL record 118 may include the URL 122 of a document that may be crawled.

A URL record 118 may also include optional metadata associated with the respective URL. The optional metadata may include one or more of the following: a format for the document specified by the URL 121, a last modification date 124 of the document specified by the URL, a change frequency 126 (also called the update rate) of the document specified by the URL, a document title 127, a document author 129, and a priority 128 of the document specified by the URL. The format 121, change frequency 126, and priority 128 may be specified by the website operator.

The change frequency 126 is a descriptor of how often a document's content is expected to change. The descriptor is one of a predefined set of valid descriptors. In some embodiments, the set of change frequency descriptors includes "always," "hourly," "daily," "weekly," "monthly," "yearly," and "never." The change frequency 126 provides a hint to the crawler as to how often the document changes. The crawler can use the hint to schedule crawls of the document accordingly. A crawler, however, may crawl the document in a way that is inconsistent with the specified change frequency. For example, a crawler may crawl a document marked as "hourly" less frequently than a document marked as "yearly." The actual crawl frequency of a document may be based on the document's importance (as represented by a score, such as PageRank), actual observed changes in the document (or lack thereof) as observed by the crawler, and other factors, as well as the change frequency specified in a sitemap.

The priority 128 is a value that specifies the relative priority of the document identified by the URL 122. The priority 128 may be the priority relative to other documents listed in the same sitemap 114, relative to other documents stored in the same web server as the document, or relative to all documents in the website. In some embodiments, the range of priority values is 0.0 to 1.0, inclusive, with 0.5 as the default value, 0.0 as the lowest relative priority, and 1.0 as the highest relative priority. In other embodiments, other priority scales, such as 0 to 10, may be used. The priority may be used by a crawler to determine which documents in the website should be crawled first. The crawler may ignore or modify the priority values in a sitemap when those priority values fail to meet predefined criteria (e.g., a requirement that the priority values in a sitemap or set of sitemaps for a website have a predefined average value, such as 0.5). In some embodiments, the priority may also be used when indexing documents.

Other parameters may also be included in a sitemap. For example, additional metadata may include the category of content at each URL, such as news, entertainment, medical, educational, promotional, etc. Also, other parameters may indicate whether the URL is intended to be made available only to users having a particular telecommunication carrier (e.g., for mobile content). Such parameters may be particularly appropriate where the content provider is a trusted provider, or one the system is confident will provide accurate information (e.g., as determined through a qualification sign-up process, or by a referral from another trusted provider).

The sitemap generator 106 may also interact with a sitemap update module 108 and a sitemap notification module 110. The sitemap notification module 110 sends a notification to a remote computer associated with a web crawler whenever a new or updated sitemap is available at the website. The notification may include the URL of the sitemap, so that the remote computer can access the sitemap. If the website uses sitemap indices, the notification, in some embodiments, may include just the URL of the sitemap index. The remote computer may then access the sitemap index and thereby identify the URLs of the sitemaps. In some other embodiments, the notification may include the sitemap, the actual sitemap index, or one of these documents in addition to a format identifier for subsets of the documents referenced by the sitemap or sitemap index or all of such documents, in which case the remote computer need not access the sitemap index at the website or access information about the formats.

The sitemap update module 108 may generate a differential sitemap based on a difference between a previously generated sitemap and a current sitemap. Further information regarding differential sitemaps is described below, in relation to FIG. 8.

Figure 5:
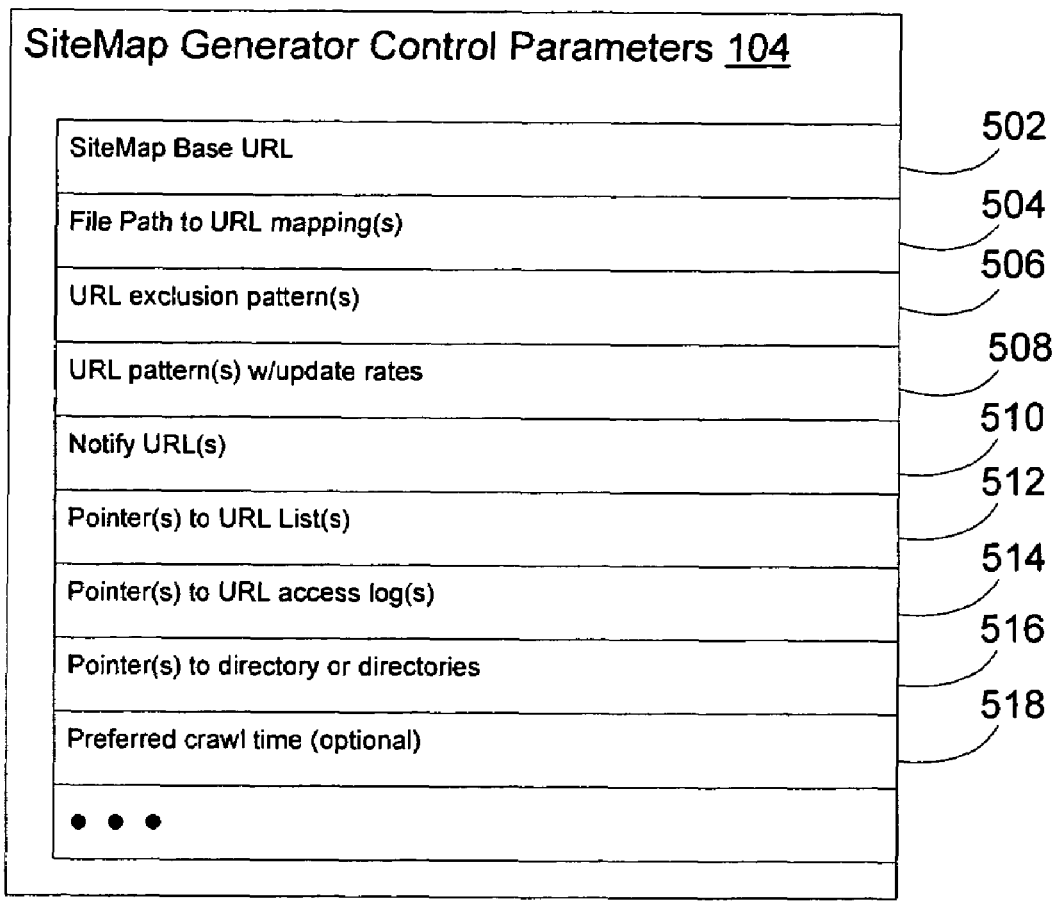
FIG. 5 is a block diagram illustrating a data structure for storing sitemap generator control parameters.

FIG. 5 is a block diagram illustrating a data structure for storing sitemap generator control parameters. The sitemap generator control parameters 104 control the generation of sitemaps and sitemap indexes. Each of the parameters may be specified by the operator of the website. The parameters may include one or more of the following: one or more sitemap base URLs 302, which specify the location(s) from which the sitemaps may be accessed by remote computers associated with web crawlers; file path-to-URL mapping(s) 304, which map directories/paths/folders or database locations in the file system 102 to externally accessible URLs (an exemplary path to URL mapping is P:/A/B/*.*>www.website.com/qu/*.*);

URL exclusion pattern(s) 306, which specify classes of URLs that are to be excluded from inclusion in sitemaps (e.g., an exclusion pattern of "www.website.com/wa/*.pr1" would indicate that all "pr1" files in the "/wa" portion of www.website.com are to be excluded from the sitemap(s));

URL pattern(s) with update rates 308, which specify classes of URLs and update rates (change frequencies) for respective URL classes (e.g., www.website.com/qu/a*.pdf> daily would indicate that the files meeting the specified patterns are expected to be updated daily.

notify URL(s) 310, which specify the URLs of remote computers associated with web crawlers to which new sitemap notifications may be transmitted;

pointer(s) to URL list(s) 312, which point to pre-made URL lists;

pointer(s) to URL access log(s) 314, which point to URL access logs;

pointer(s) to a directory or directories 316, which point to directories/folders/paths or database locations in the file system 102; and preferred crawl time(s) 318, which specifies preferred times of the day for web crawlers to crawl the website.

It should be appreciated that the listed parameters are merely exemplary and that fewer, additional and/or alternative parameters may be included.

Figure 6:
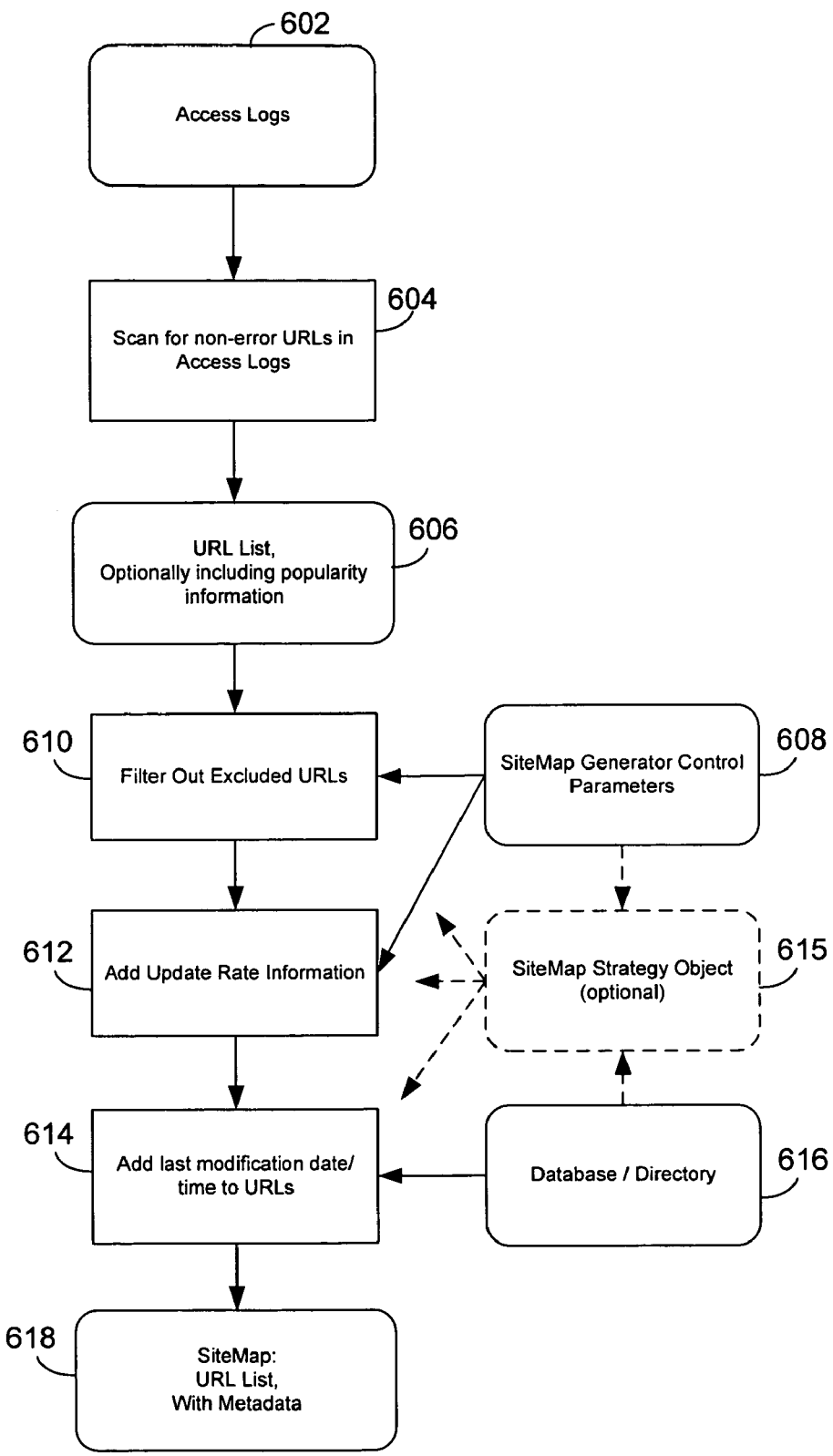
FIG. 6 is a flow chart illustrating a process for generating a sitemap.

FIG. 6 is a flow chart illustrating a process for generating a sitemap. As described above, a source of information about documents stored on the website is the access logs of the website. The access logs of the website are first accessed (602). The access logs may be found by following pointers to URL access logs. The access logs may then be scanned for non-error URLs (604). Non-error URLs are URLs that properly specify an existing and accessible document. Thus, for example, a URL for a document that is no longer on the website may be deemed an error URL. A list of URLs may then be generated (606). The list may include the non-error URLs found in the access logs.

The list may also include document popularity information derived from the access logs. The document popularity information may be determined based on the numbers of accesses each non-error URL has. The document popularity information serves as an additional hint of which documents are to be given a higher priority during crawling (e.g., scheduled to be crawled first, or more likely to be crawled than lower priority documents), based on which documents are in high demand (i.e., are accessed more often).

After the list of URLs is generated, the list may be filtered for excluded URLs (610). The URL exclusion patterns from the sitemap generator control parameters may be used as the filter that is applied to the list of URLs (608). Alternately, URL exclusion patterns may be obtained elsewhere, or permanently encoded in a customized sitemap generator for the website. URLs in the list that match any of the URL exclusion patterns may then be removed from the list.

Update rate information may be added to the list of URLs, for the respective URLs in the list (612). In some embodiments, the update rates may be obtained from the sitemap generator control parameters 104, or more particularly, the URL pattern(s) with update rates (608).

Last modification dates and times for the respective URLs in the list of URLs may then be added (614). The last modification dates may be obtained from the file system, which may be a database and/or a directory tree 616, as described above.

In an alternate embodiment, a sitemap strategy object 615 controls the filtering operation 610, update rate information adding operation 612, and the last modification date adding operation 614, using information obtained from a database 616 and/or the sitemap generator control parameters 608. In some embodiments, the sitemap strategy object determines which URLs (or URIs) to filter and which attributes to add to specific URLs (or URIs) by performing a database query on the underlying database 616.

The sitemap may be generated from the resulting list of URLs, including any last modification date/time information, optional popularity information, and optional update rate information that has been included or obtained for the listed URLs (618). Within the sitemap, the metadata for the URLs listed in the sitemap may comprise the last modification date/time information, optional popularity information, and optional update rate.

Figure 7:
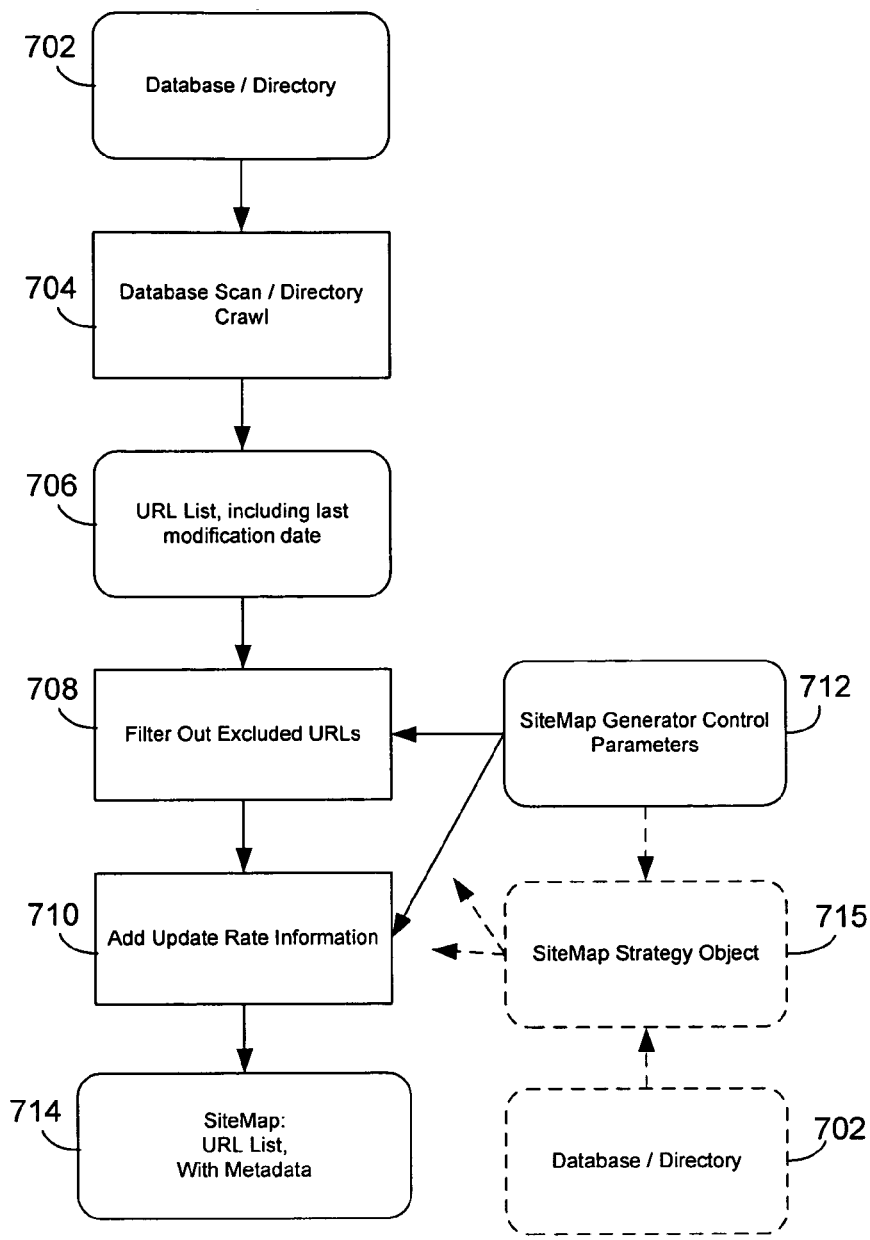
FIG. 7 is a flow chart illustrating another process for generating a sitemap.

FIG. 7 is a flow chart illustrating another process for generating a sitemap. The process of FIG. 7 is similar to that of FIG. 6, with the difference being that, in the process of FIG. 7, the initial source of document information is the file system database or directory tree (702), rather than access logs. A scan of the database or a traversal of the directory tree may first be performed (704). From the database scan or directory tree traversal, a list of URLs and associated last modification dates may be obtained (706). The list may be filtered for excluded URLs (708), using the URL exclusion patterns from the sitemap generator control parameters as the filters (712). Additional metadata, such as document update rate information associated with the respective URLs in the list of URLs, may also be added (710). The update rate information may be taken from the sitemap generator control parameters (712). The sitemap may be generated from the list of non-excluded URLs, the last modification date information, and additional information such as the update rate information.

In an alternate embodiment, a sitemap strategy object 715 may control the filtering operation 708 and/or adding of metadata 710 to the list of URLs or URIs in the sitemap 714 using information obtained from the underlying database 702 and/or the sitemap generator control parameters 712. In some embodiments, the sitemap strategy object 715 may determine which URLs (or URIs) to filter and which attributes to add to specific URLs (or URIs) by performing a database query on the underlying database 702.

The sitemap generation processes illustrated in FIGS. 6 and 7 may be adapted to use alternative sources of document information and/or use multiple sources of document information. For example, the sitemap generator may initially extract URLs from one or more pre-made URL lists or from a content management system associated with the website. Regardless of the source from which the URLs are extracted, the sitemap generator may collect document metadata from as many of the sources of document information as needed. For example, the sitemap generator may extract URLs from pre-made URL lists, obtain the last modification dates from the file system and obtain document popularity information from the access logs. Any suitable combination of sources of document information may be used to generate the sitemaps.

Figure 8:
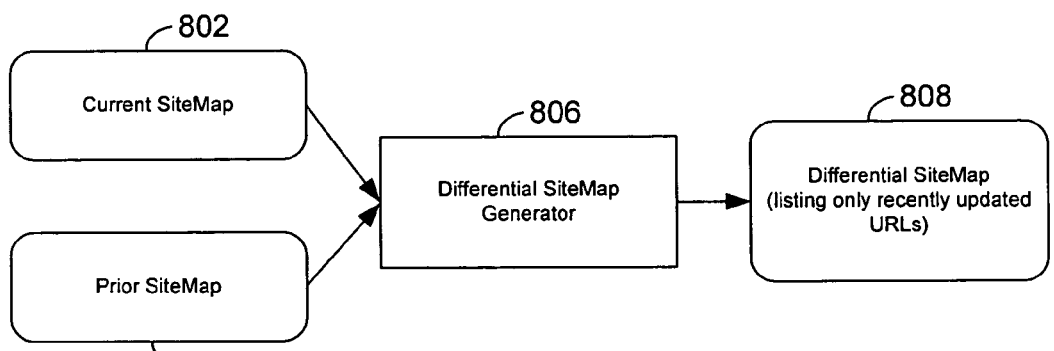
FIG. 8 is a flowchart illustrating a process for generating a differential sitemap.

FIG. 8 is a flowchart illustrating a process for generating a differential sitemap. A differential sitemap is a sitemap that is generated based on a difference between a previously generated sitemap and a current sitemap. The differential sitemap may include URLs that were not included in the previously generated sitemap and URLs that were included in the previously generated sitemap but which have new or updated metadata. For example, a URL with an updated last modification date would be included in the differential sitemap. The presence of an updated last modification date for the URL means that the document at the respective URL has been updated since the previously generated sitemap.

A current sitemap (802) and a previously generated sitemap (804) may be processed by a differential sitemap generator, such as the sitemap update module 108 (806). The differences between the two sitemaps may be ascertained and a differential sitemap may be generated (808).

Figure 9:
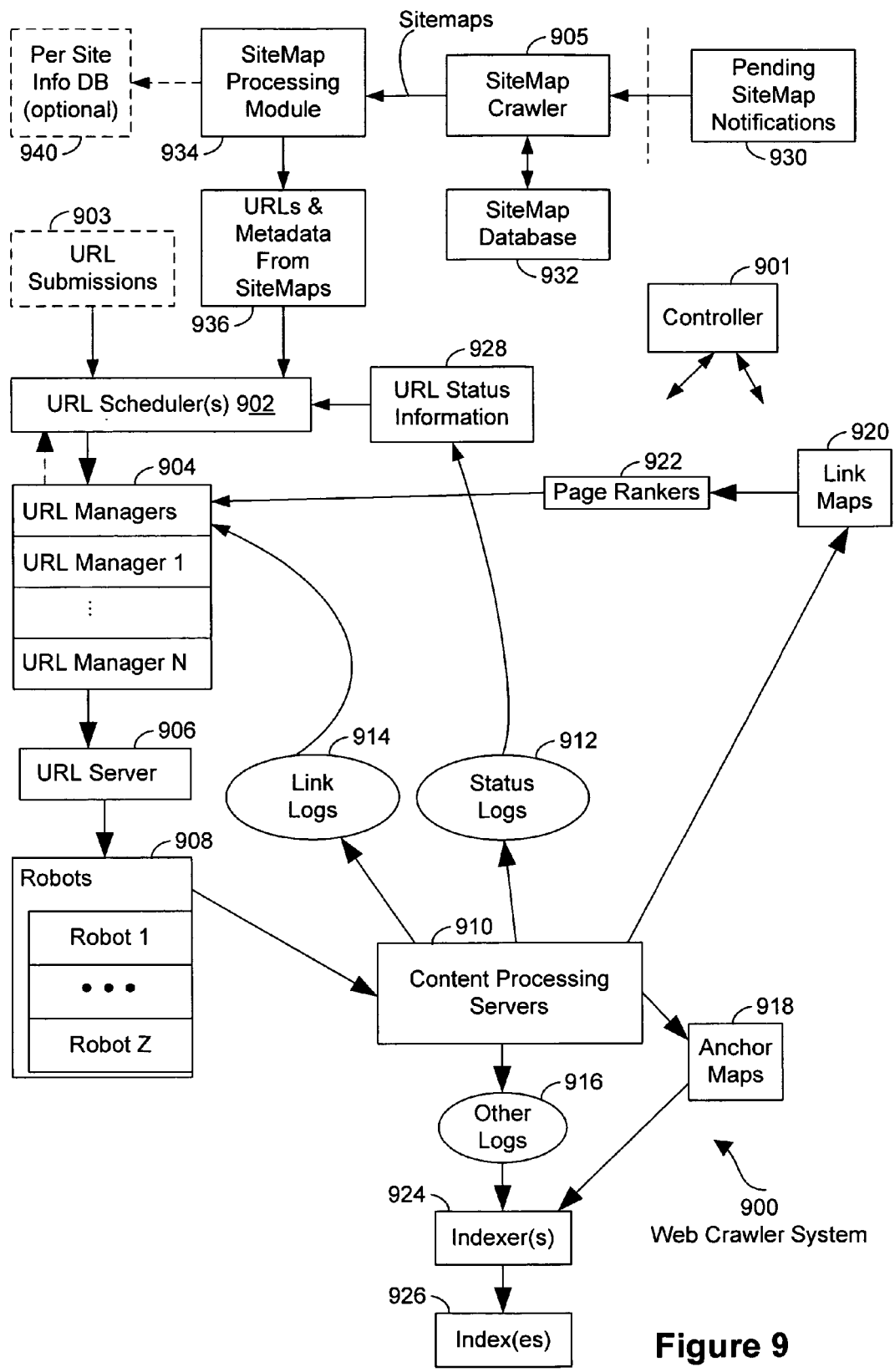
FIG. 9 is a block diagram illustrating a web crawler system.

FIG. 9 is a block diagram illustrating a web crawler system 900. The web crawler system 900, which may be a part of and/or associated with a search engine, crawls locations corresponding to documents stored in web servers.

The sitemap crawler 905 accesses sitemaps generated by websites or web servers. The sitemap crawler 905 receives sitemap notifications. The sitemap notifications 930 are received from web servers or websites that have documents available for crawling. A notification from a web server or website informs the sitemap crawler that one or more sitemaps listing URLs of documents that may be crawled are available for access. The notification may include the URL of a sitemap, or the URLs of two or more sitemaps. The notification may include the URL of a sitemap index, or it may include the content of a sitemap index. In some embodiments, the notification may include the sitemap index or the full sitemap. The sitemap crawler 905 may access the sitemap index at the sitemap index URL to learn the URLs of the sitemaps and then access the sitemaps.

The sitemap crawler 905 may access sitemaps from web servers or websites and may store copies of the accessed sitemaps in a sitemap database 932. The sitemap database 932 stores the sitemaps and information associated with the sitemaps, such as the web servers and/or websites with which the sitemaps are associated, the last modification dates of the sitemaps, and update rate information associated with the sitemaps.

Accessed sitemaps may be provided to a sitemap processing module 934 for processing. The sitemap processing module 934 processes the sitemaps and identifies the URLs and associated metadata 936. The sitemaps may be a source of URLs and associated metadata information for the URL scheduler 902. In some embodiments, an optional, additional source of URLs and associated metadata may be received by direct submission 903 by users. For example, user may supply information about the format of documents associated with the sitemap or sitemaps.

The URL scheduler 902 determines which URLs will be crawled in each crawling session. The URL scheduler 902 may store that information in one or more data structures (not shown), such as a set of list data structures. In some embodiments, the URL scheduler 902 allocates URLs to segments of the data structure, where the segments correspond to the crawl sessions. In these embodiments, the URL scheduler 902 also determines which URLs within each segment are to be crawled. In some embodiments, there may be a number of URL schedulers 902, which are run before each segment is crawled. Each scheduler 902 is coupled to a corresponding URL manager 904, which is responsible for managing the distribution of URLs to URL server 906. Alternately, each URL scheduler 902 may be coupled to two or more of the URL managers, enabling the URL distribution function for each crawl session to be spread over multiple URL managers. The URL schedulers 902 may be adapted to receive URLs and metadata 936 extracted from sitemaps.

A controller 901 selects a segment for crawling. The selected segment is referred to hereinafter as the "active segment." Typically, at the start of each session, the controller 901 selects a different segment as the active segment so that, over the course of several sessions, all the segments are selected for crawling in a round-robin manner. The controller 901 may also select a user agent to be presented by the crawler, which is associated with the format for the active segment. For example, the user agent may involve parameters that cause the crawler to imitate an iMode device or other mobile device or group of devices.

A query-independent score (also called a document score) may be computed for each URL by URL page rankers 922. The page rankers 922 compute a page importance score for a given URL. In some embodiments, the page importance score may be computed by considering not only the number of URLs that reference a given URL, but also the page importance score of such referencing URLs. Page importance score data may be provided to URL managers 904, which may pass a page importance score for each URL to URL server 906, robots 908, and content processing servers 910. One example of a page importance score is PageRank, which is the page importance metric used in the Google search engine. An explanation of the computation of PageRank is found in U.S. Pat. No. 6,285,999, which is incorporated by reference herein in its entirety as background information. In some embodiments, information from the sitemaps may be incorporated into the computation of the page importance score. An example of sitemap information that may be incorporated into the page importance score is the priority 128.

From time to time, the URL server 906 may request URLs from the URL managers 904. In response, the URL managers 904 may provide the URL server 906 with URLs obtained from the data structure. The URL server 906 may then distribute URLs from the URL managers 904 to crawlers 908 (hereinafter also called "robots" or "bots") to be crawled. A robot 908 is a server that retrieves documents at the URLs provided by the URL server 906. The robots 908 use various known protocols to download pages associated with URLs (e.g., HTTP, HTTPS, Gopher, FTP, etc.). In some embodiments, a robot 908 retrieves from the per-site information database 940 crawl rate and/or crawl interval information for a specified website, and then uses the retrieved information to control the rate at which URLs or URIs are fetched by the robot 908 from the website. The robots 908 may also, where appropriate, be passed format information for a document so as to properly imitate a device or devices for which the document was formatted.

Pages obtained from URLs that have been crawled by robots 908 are delivered to content processing servers 910, which perform a number of tasks. In some embodiments, these tasks include indexing the content of the pages, generating records of the outbound links in the pages, detecting duplicate pages, and creating various log records to record information about the crawled pages. In one embodiment, these log records are stored in log files, including link logs 914, status logs 912, and other logs 916. The link logs 914 include a link record for each document obtained from a URL by a robot 908 and passed to the content processing servers 910. Each link log 914 record identifies all the links (e.g., URLs, also called outbound links) that are found in the document associated with the record and the text that surrounds the link. The information in the link logs 914 may be used by the content processing servers 910 to create link maps 920.

The records in the link map 920 are similar to records in the link logs 914, with the exception that text is stripped and the records are keyed by a "fingerprint" of the normalized value of the source URL. In some embodiments, a URL fingerprint is a 64-bit integer determined by applying a hash function or other one-way function to a URL. The bit-length of the URL fingerprint may be longer or shorter than 64 bits in other embodiments. The records in each link map 920 may optionally be sorted or keyed by a fingerprint. The link maps 920 are used by the page rankers 922 to computer or adjust the page importance score of URLs. In some embodiments, such page importance scores may persist between sessions.

The status logs 912 log the status of the document processing performed by the content processing servers 910. The status logs may include URL status information 928 (e.g., whether a document existed at the specified URL, last modification date information, and update rate information). The URL status information may be transmitted to the URL scheduler(s) 902. The URL scheduler(s) may use the URL status information to schedule documents for crawling.

In some embodiments, the content processing servers 910 may also create anchor maps 918. The anchor maps 918 map the "anchor text" in hyperlinks to the URL of the target URLs of the hyperlinks. In documents that use HTML tags to implement the hyperlinks, the anchor text is the text located between a pair of anchor tags. For example, the anchor text in the following pair of anchor tags is "Picture of Mount Everest":

<A href="http://www.website.com/wa/me.jpg">Picture of Mount Everest</A>.

In some embodiments, sitemap-supplied document metadata may also be used for creating anchor maps. For example, document metadata such as the document title, document author, or document description may be used to create the anchor maps. However, it should be appreciated that any field appearing in a sitemap may generally be included in an anchor map.

In some embodiments, the records in an anchor map 918 may be keyed by the fingerprints of outbound URLs present in link log 914. Thus, each record in an anchor map 918 may comprise the fingerprint of an outbound URL and the anchor text that corresponds to the URL in link log 914. Anchor maps 918 are used by the indexer(s) 924 to facilitate the indexing of "anchor text" as well as to facilitate the indexing of URLs that do not contain words. For example, consider the case in which the target document at an outbound URL (e.g., the URL in the above example) is a picture of Mount Everest and there are no words in the target document. However, anchor text associated with the URL, "Picture of Mount Everest" may be included in an index 926, thereby making the target document accessible via a search engine using the index 926.

The anchor maps 918 and other logs 916 are transmitted to indexer(s) 924. The indexer(s) 924 use the anchor maps 918 and other logs 916 to generate index(es) 926. The index(es) are used by the search engine to identify documents matching queries entered by users of the search engine.

Figure 10:
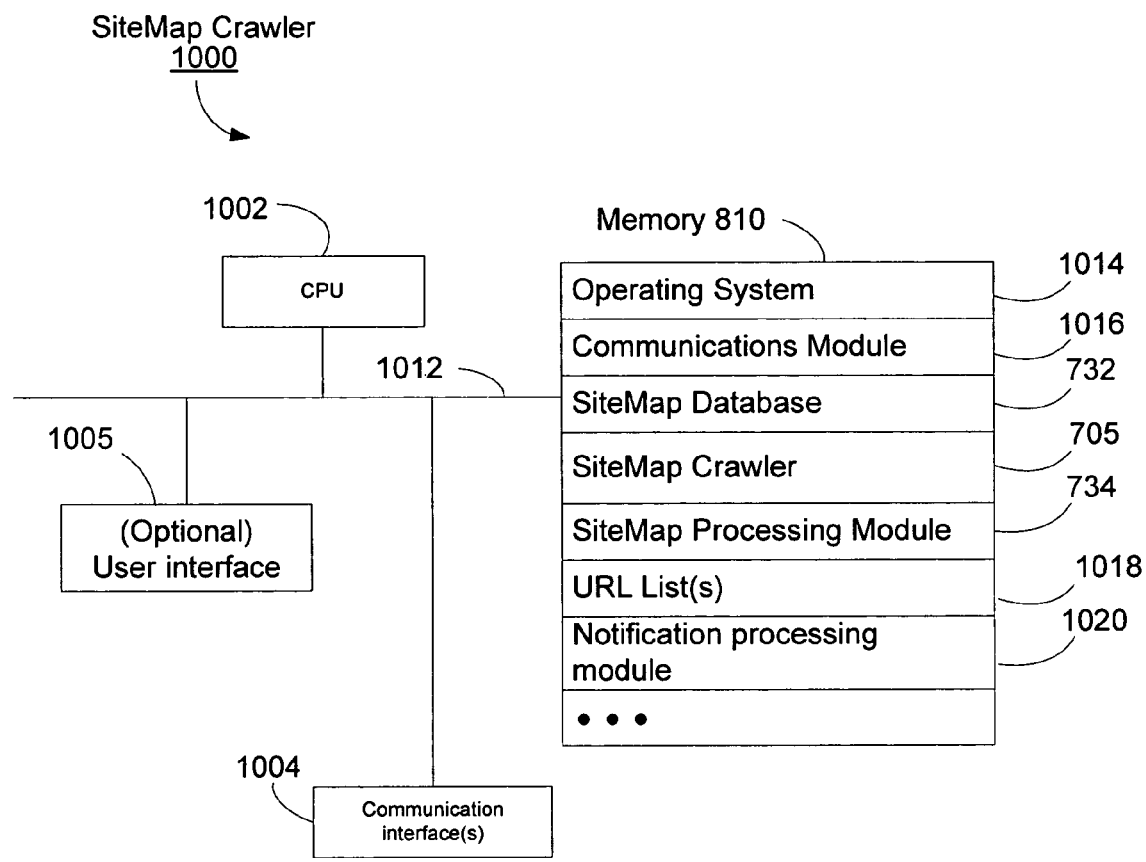
FIG. 10 is a block diagram illustrating a sitemap crawler.

FIG. 10 is a block diagram illustrating a sitemap crawler system 1000. The sitemap crawler system 1000 typically includes one or more processing units (CPU's) 1002, one or more network or other communications interfaces 1004, memory 1010, and one or more communication buses or signal lines 1012 for interconnecting these components.

The sitemap crawler system 1000 optionally may include a user interface 1005, which may comprise a keyboard, mouse, and/or a display device. The memory 1010 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1010 may include one or more storage devices remotely located from the CPU(s) 1002. In some embodiments, memory 1010 stores the following programs, modules and data structures, or a subset thereof:

- an operating system 1014 that includes procedures for handling various basic system services and for performing hardware dependent tasks;
- a network communication module 1016 that is used for connecting the sitemap crawler system 1000 to other computers via the one or more communication network interfaces 1004 and one or more communication networks, such as the Internet, other wide area networks, local area networks, metropolitan area networks, and so on;
- a sitemap database 932 that stores accessed sitemaps;
- a sitemap crawler 905 that accesses sitemaps provided by web servers;
- a sitemap processing module 934 that receives sitemaps and processes the sitemaps to identify URLs and associated metadata;
- URL list(s) 1018 that list URLs of documents that may be crawled; and
- a notification processing module 1020 that processes new sitemap notifications received from web servers.

Each of the above identified elements may be stored in one or more of the previously mentioned memory devices, and may correspond to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 1010 may store a subset of the modules and data structures identified above. Furthermore, memory 1010 may store additional modules and data structures not described above.

In embodiments in which one or more of the sitemap indexes or sitemaps contains per-site information, such per-site information is extracted and added to a per-site information database 940 (e.g., by the sitemap crawler 905). When appropriate information (e.g., language and/or location information) is available in the per-site information database 940, it is used by the indexers 924 to add per-site information (e.g., language and/or location information) to the indexes 926. The inclusion of website geography and/or language information in the indexes 926 allows searches to be performed by a search engine, using the indexes 926, that include geographic and/or language restrictions.

For instance, when the indexes of a search engine include geographic information about at least some websites, the search engine can service requests such as "pizza within 1 mile of London Bridge, London, England." When the indexes of a search engine include language information about at least some websites, the search engine can service requests such as "German URLs containing 'George Bush.'" In embodiments in which the per-site information includes crawl rate information and/or crawl time intervals, that information is used by the URL schedulers 902 and/or robots 908 to control the times and rates at which web pages are crawled.

Figure 11:
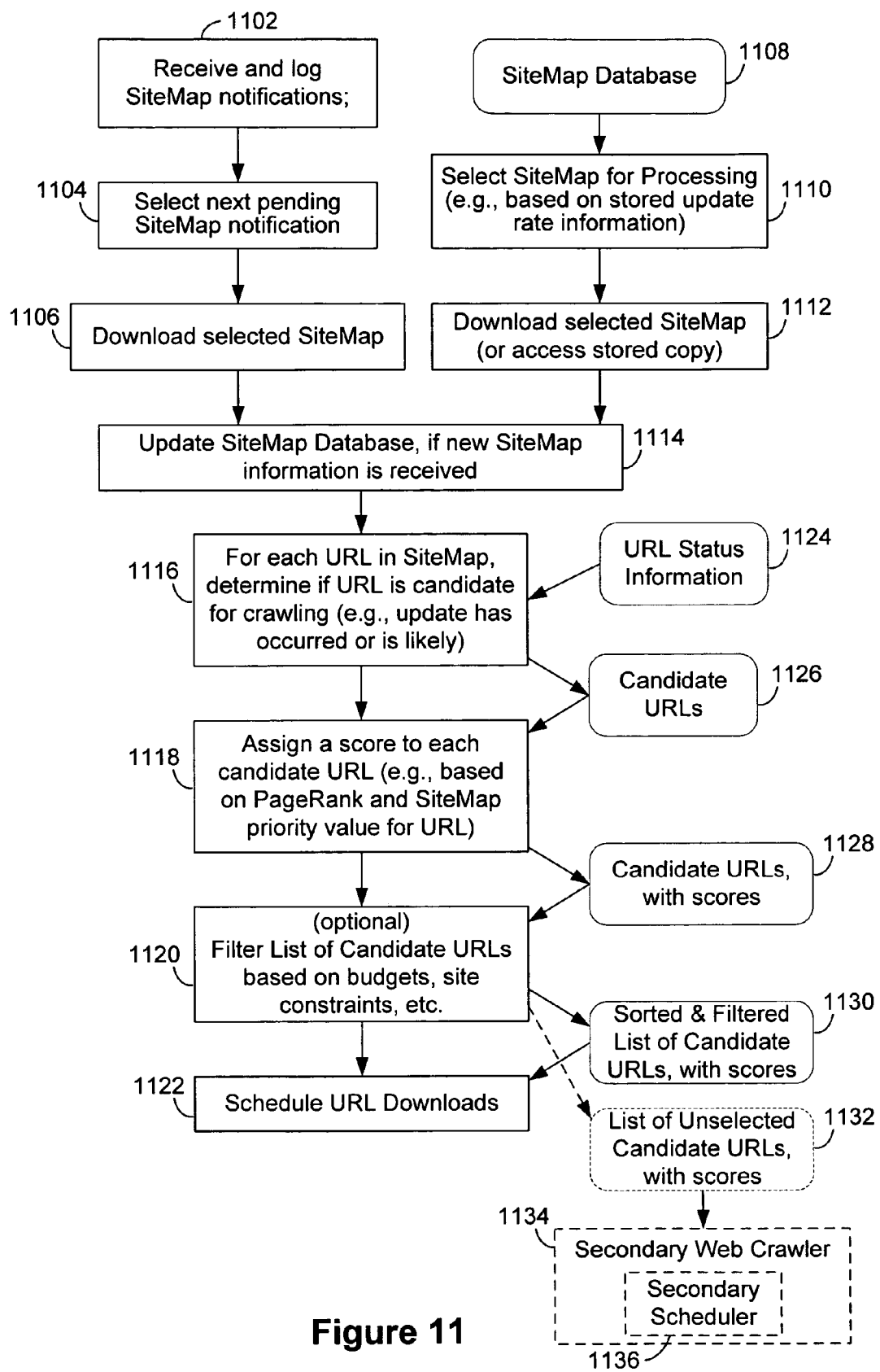
FIG. 11 is a flowchart illustrating a process for scheduling document downloads based on information included in a sitemap.

FIG. 11 is a flowchart illustrating a process for scheduling document downloads based on information included in a sitemap. In some embodiments, scheduling documents for downloading means generating a list of document identifiers that identify the scheduled documents. The list of document identifiers may be an ordered list, with document identifiers earlier in the list having higher priority or importance than document identifiers lower in the list.

In some embodiments, the sitemap crawler may access a sitemap upon receipt of a notification that a current version of the sitemap is available. Sitemap notifications are received and logged (1102). The next pending sitemap notification may then be selected (1104). The sitemap(s) associated with the selected sitemap notification may then be downloaded from the web server (1106).

In some other embodiments, the sitemap crawler may periodically select sitemaps for processing and access the sitemaps without waiting for notifications, in addition to or in lieu of waiting for sitemap notifications. The sitemap database may also be accessed (1108). A sitemap from the database may then be selected for processing (1110). The selection may be made based on information stored in the database, such as last modification date information or update rate information. For example, when the "age" of a sitemap (e.g., the current date minus the date of the sitemap, or the current date minus the date of last modification date in the sitemap), is older than the shortest predicted update period for any document listed in the sitemap, the sitemap may be selected for downloading. The selected sitemap may be accessed, by download from the web server or by accessing the stored copy of the sitemap at the sitemap database (1112).

The sitemap database may then be updated with new sitemap information if such information is received from the download (1114). In embodiments in which one or more of the sitemap indexes or sitemaps contains per-site information, a per-site information database is updated with the received per-site information.

For each URL in the sitemap, a determination as to whether the URL is a candidate for crawling may be made (1116). The determination may be made based on the URL status information, such as whether the document at the URL has been or is likely to have been updated, or whether the URL properly specifies an accessible document (1124). URLs that are determined to be candidates for crawling may be identified as candidate URLs (1126) and each of them may be assigned a score (1118). The score for each candidate URL may be based on the page importance score (e.g., PageRank) of the URL and the priority value of the URL, which was extracted from the sitemap. After scoring, the candidate URLs (1128) may filtered.

The filter may select a subset of the candidate URLs based on one or more predefine criteria, such as budgets, site constraints (e.g., limits on the number of documents that the crawler is allowed to download during the time period of the crawl), and so forth. The resulting list of candidate URLs may then be used to schedule URL downloads (1122). As noted above, scheduling URL downloads may comprise generating an ordered list of URLs or document identifiers, with document identifiers earlier in the list representing documents having higher priority or importance that documents placed later in the ordered list. Furthermore, as noted above, in some embodiments, the scheduling operation 1122 may take into account per-site information received in the sitemap indexes or sitemaps, such as crawl interval and/or crawl rate information for specific web sites.

In some embodiments, the scheduler may schedule more documents for crawling than the crawler can actually crawl. In some embodiments, a crawler may have a crawl budget for a website or web server. The budget is a maximum number of documents a crawler may crawl, in a particular crawl session, for the particular website or web server. In other words, the budget may be a self-imposed limit, imposed by the web crawler, on how many documents to crawl for a particular web server or website. The budget limits the crawling a crawler will perform for a particular website or web server, ensuring that the crawler can crawl other websites or web servers before reaching its crawl limit.

In some embodiments, a website/web server operator may set site constraints to constrain crawling for a particular website or web server. The goal of the site constraints are to limit crawling for the particular website or web server, in order to prevent network resources associated with the website or web server from being depleted by the crawler. The site constraints may include a maximum number of documents, defined by the website operator, which may be crawled for the particular website during a define period of time (e.g., per hour or per day). In addition, the constraints may include the format of documents on the website or web server, such as particular formats of mobile documents.

The filtering of the candidate URLs may lead to the generation of a list of sorted and filtered candidate URLs (1130) and a list of unselected candidate URLs 1132. The list of sorted and filtered candidate URLs may be transmitted to the scheduler, where the scheduler may schedule the crawls for the URLs in the list. The list of unselected URLs 1132 may be transmitted to a secondary web crawler 1134, which may include a secondary scheduler 1136. The secondary scheduler 1136 may then schedules the URLs in the list 1132 for crawling by the secondary web crawler 1134.

The URL scheduler may schedule crawls for URLs in the list according to the document metadata obtained from the sitemaps. As described above, the metadata may include document last modification date information, document update rate information, document priority information, and document popularity information.

The scheduler may schedule crawls of URLs based on the last modification date information from the sitemaps. The scheduler may defer scheduling of a document corresponding to a URL for crawling if the document has not been modified since the last date/time the document was downloaded by the web crawler. In other words, the scheduler may defer scheduling of a document for crawling if the last modification date of the document is no later than the date/time of the last download of the document by the web crawler. Such deferral helps conserve network resources by avoiding re-downloading of documents that have not changed.

The scheduler may also schedule crawls of documents based on the update rate information from the sitemaps. The scheduler may schedule crawls of a document if a predefined function of the update rate and the last date/time at which the document was downloaded satisfy predefined criteria. In some embodiments, the document may be scheduled for downloading if the difference between the last date/time at which the document was downloaded and the current time is greater than the update rate as indicated by the update rate information. For example, if the update rate of a document is "weekly" and the last time the document was downloaded was two weeks ago, the scheduler may schedule the document for downloading. This helps conserve network resources by avoiding downloading of documents that is expected to be unchanged since the last download.

The scheduler may also adjust scores of candidate URLs based on their relative priorities. The scheduler determines boost factors corresponding to the relative priorities and applies them to the scores. In some embodiments, the scheduler may also determine boost factors based on document popularity information, the document popularity information being an additional indication of document priority.

In some embodiments, the scores included with the selected or unselected candidate URLs may be used to determine which URLs are must-crawl URLs. That is, the score may help determine whether a document is guaranteed to be crawled. URLs whose scores are high may be designated as must-crawl. This ensures that important pages are scheduled for crawling.

Figure 12:
FIG. 12 is an exemplary screen shot showing a display for adding sitemaps to a search system.

FIG. 12 is an exemplary screen shot showing a display for adding a sitemap to a search system. The display shows instructions for a user to enter an identifying URL for a sitemap the user has created. In addition, a blank entry box is provided for receiving the URL, and a submission button is also provided. The display also provides a number of hyperlinks that, if selected, will provide the user with additional instructions for selecting and identifying a URL for a sitemap.

The exemplary display of FIG. 12 also provides the user with an extra option if they would like to provide information for a sitemap associated with a website intended to be viewed using mobile devices. The submission of information about the sitemap, though shown here as a manual webpage operation, may also be automated, such that an application may be programmed to submit the site map information to the remote server, and the user merely needs to select a command or otherwise make an indication that the sitemap should be submitted to the remote server.

FIG. 13 is an exemplary screen shot showing a display for adding a mobile sitemap to a search system. This display may be shown, for example, when a user has selected to provide a mobile sitemap on the display of FIG. 12. Again, the user is provided with an opportunity to enter the URL of the sitemap. In addition, on this screen, the user is able to specify (e.g., via radio button selection) a format or formats for the documents at the website associated with the sitemap. For example, WML and XHTML are standards defining the format for content authored for viewing on particular mobile communication devices such as cellular telephones. Alternatively, certain PDAs have larger screens than do most telephones, so authors may direct their content to such screens. In addition, a derivative of HTML known as cHTML, or iMode, has been developed by telecommunication company NTT DoCoMo for mobile devices. Thus, an author may write or format for one or more of these formats, and may be given the opportunity to associate a sitemap with documents in the appropriate format so that the server selects a crawler that accurately reads those documents.

FIG. 14 is an exemplary screen shot showing a display for viewing and managing sitemaps identified with a user. This display may allow a busy webmaster to keep track of the progress of the submission of various sitemaps. In general, the display shows a list of all sitemaps (by location and name) that have been submitted, the type (mobile or web) of the documents associated with the sitemaps, the time since the sitemap was first identified by the user and since the remote server last downloaded the sitemap, and the status of the sitemap. For example, where errors have occurred in reading the sitemap, such as if the sitemap does not follow a predetermined format, the status of the sitemap may be listed as "parsing error." Alternatively, or in addition, error may be indicated to a user via messaging, such as e-mail or instant messaging, so that the user may immediately know if there has been a problem.

Figure 15:
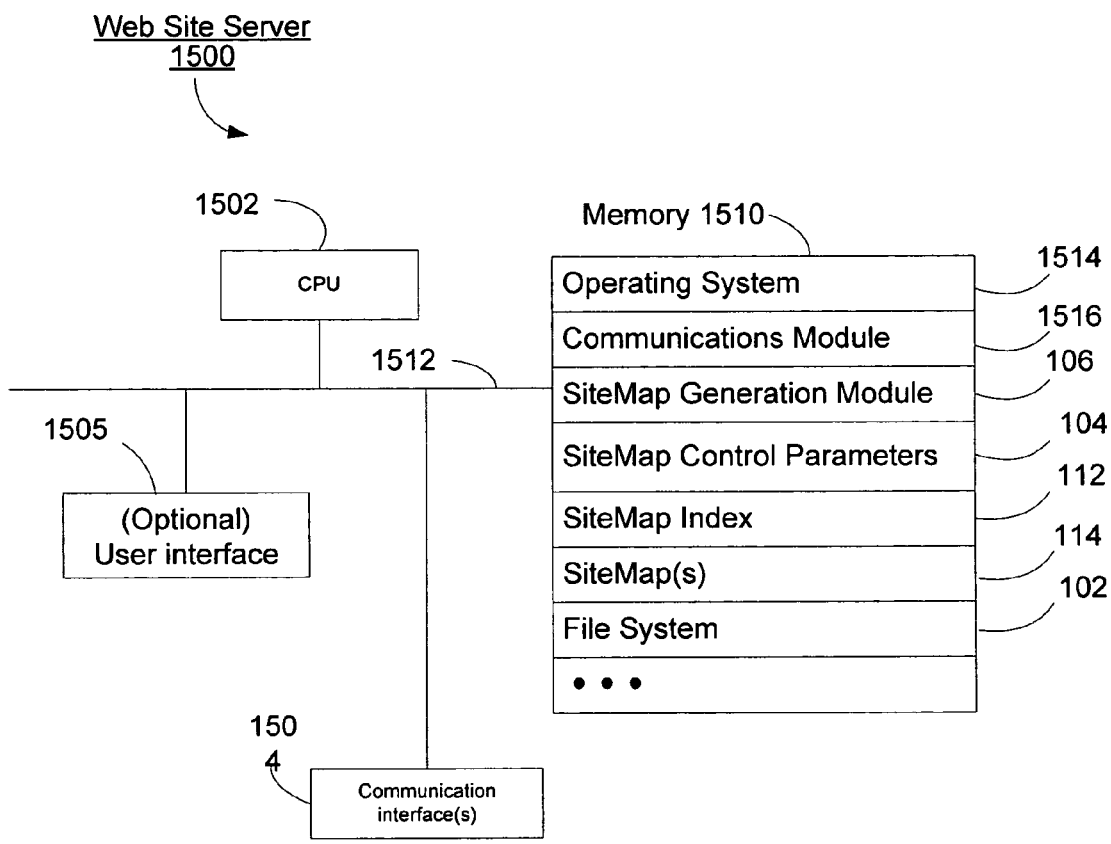
FIG. 15 is a block diagram illustrating a website server.

FIG. 15 is a block diagram illustrating a website server 1500. The website server 1500 (or "web server") typically includes one or more processing units (CPU's) 1502, one or more network or other communications interfaces 1504, memory 1510, and one or more communication buses or signal lines 1512 for interconnecting these components. The website server 1500 optionally may include a user interface 1505, which may comprise a display device, mouse, and/or a keyboard. The memory 1510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

Memory 1510 may optionally include one or more storage devices remotely located from the CPU(s) 202 (e.g., network attached storage). In some embodiments, the memory 210 stores the following programs, modules and data structures, or a subset thereof:

an operating system 1514 that includes procedures for handling various basic system services and for performing hardware dependent tasks;

a network communication module 1516 that is used for connecting the website server 1500 to other computers via the one or more communication network interfaces 1504 and one or more communication networks, such as the Internet, other wide area networks, local area networks, metropolitan area networks, and so on;

a sitemap generation module 106 that generates sitemaps;

sitemap control parameters 104 that control or guide sitemap generation;

a sitemap index 112 that lists URLs of sitemaps stored at the website server 200;

one or more sitemap(s) 114 that list URLs of documents that may be crawled; and a website file system 102 that stores and organizes documents.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1510 may store a subset of the modules and data structures identified above. Furthermore, memory 1510 may store additional modules and data structures not described above.

In practice, and as recognized by those of ordinary skill in the art, items shown separately in the figures above could be combined and some items could be separated. For example, some items shown separately in the figures could be implemented on single servers and single items could be implemented by one or more servers. As recognized by those of ordinary skill in the art, a website may be implemented on a single server, such as a web server, or on a plurality of servers, such as a plurality of web servers. The actual number of servers used to implement a website server or a crawler system, or other system, and how features are allocated among them, will vary from one implementation to another, and may depend in part on the amount of data traffic that the system must handle during peak usage periods as well as during average usage periods. For convenience of explanation, websites will be described below as if they are implemented on a single web server.

A number of embodiments of the invention have been described. Nevertheless, it will be understood that various modifications may be made without departing from the spirit and scope of the invention. For example, the steps discussed above may be performed in an order other than that shown, and certain steps may be removed or added. Accordingly, other embodiments are within the scope of the following claims.

What is claimed is:

1. A computer-implemented method of analyzing documents or relationships between documents, comprising:
    receiving a notification of an available metadata document containing information about one or more network-accessible documents;
    obtaining a document format indicator associated with the metadata document, the document format indicator specifying a format in which content of at least one of the network-accessible documents is stored;
    selecting, using the document format indicator, a document crawler having an operating mode that defines one or more content formats that the document crawler is capable of accessing, including the format specified by the document format indicator; and
    crawling with a computer at least some of the network-accessible documents using the selected document crawler and operating mode.

2. The method of claim 1, wherein the one or more network-accessible documents comprise a plurality of web pages at a common domain.

3. The method of claim 1, wherein the metadata document comprises a list of document identifiers.

4. The method of claim 3, wherein the one or more network-accessible documents comprise a plurality of web pages at a common domain.

5. The method of claim 1, wherein the document format indicator indicates one or more mobile content formats.

6. The method of claim 5, wherein the mobile content formats are selected from the group consisting of XHTML, WML, iMode, and HTML.

7. The method of claim 1, further comprising adding information retrieved from crawling at least some of the network-accessible documents to an index.

8. The method of claim 7, further comprising receiving a search request from a mobile device and transmitting search results to the mobile device using information in the index.

9. The method of claim 1, wherein the available metadata document comprises an index referencing a plurality of lists of documents.

10. The method of claim 1, further comprising receiving an indication of document type for the one or more network-accessible documents and classifying the documents using the indication of document type.

11. The method of claim 10, further comprising verifying the identity of a provider of the indication of document type to ensure that the provider is trusted.

12. The method of claim 10, wherein the document type is selected from a group consisting of news, entertainment, commerce, sports, travel, games, and finance.

13. A system for crawling network-accessible documents, comprising:
    a memory storing organizational information about network-accessible documents at one or more websites, and format information for the documents;
    a crawler configured to access the network-accessible documents using the organizational information; and
    a format selector associated with the crawler to cause the crawler to assume a persona compatible with formats indicated by the format information.

14. The system of claim 13, wherein the organizational information comprises a list of URLs.

15. The system of claim 13, further comprising an agent repository that stores parameters for causing the crawler to assume a selected persona.

16. A system for crawling network-accessible documents, comprising:
    a memory storing organizational information about network-accessible documents at one or more websites, and format information for the documents;
    a crawler configured to access the network-accessible documents using the organizational information; and
    means for selecting a crawler persona to present in accessing the network-accessible documents.

* * * * *

UNITED STATES PATENT AND TRADEMARK OFFICE
CERTIFICATE OF CORRECTION

PATENT NO.       : 7,653,617 B2                                                     Page 1 of 1
APPLICATION NO. : 11/415947
DATED            : January 26, 2010
INVENTOR(S)      : Strohm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 138 days.

Signed and Sealed this

Twenty-eighth Day of December, 2010

David J. Kappos
*Director of the United States Patent and Trademark Office*